(12) United States Patent
Goodwin et al.

(10) Patent No.: US 9,731,180 B2
(45) Date of Patent: Aug. 15, 2017

(54) TAPERED ISOLATING ELEMENT FOR A BALL BAT AND SYSTEM FOR USING SAME

(71) Applicant: Wilson Sporting Goods Co., Chicago, IL (US)

(72) Inventors: Ty B. Goodwin, Vancouver, WA (US); Jeffrey A. Flood, Sandy, OR (US); Mark A. Fritzke, Portland, OR (US); Glen R. Mason, Hillsboro, OR (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 14/041,604

(22) Filed: Sep. 30, 2013

(65) Prior Publication Data
US 2014/0206485 A1    Jul. 24, 2014

Related U.S. Application Data

(60) Provisional application No. 61/756,089, filed on Jan. 24, 2013.

(51) Int. Cl.
*A63B 59/50* (2015.01)
*G06Q 30/06* (2012.01)
*A63B 102/18* (2015.01)

(52) U.S. Cl.
CPC ......... *A63B 59/50* (2015.10); *G06Q 30/0621* (2013.01); *A63B 2102/18* (2015.10); *A63B 2209/00* (2013.01)

(58) Field of Classification Search
CPC .................................................... A63B 59/18
USPC ................. 473/564–566, 567, 457, 520, 568
See application file for complete search history.

(56) References Cited

U.S. PATENT DOCUMENTS

| | | |
|---|---|---|
| 1,026,990 A | 5/1912 | Matson |
| 1,509,733 A | 9/1924 | Langford ...................... 473/520 |
| 1,650,183 A | 11/1927 | Brooks |
| 3,116,926 A | 1/1964 | Owen et al. .................... 273/72 |
| 3,830,496 A | 8/1974 | Reizer ............................. 173/72 |
| 3,861,682 A | 1/1975 | Fujii ............................... 273/72 |
| 3,876,204 A | 4/1975 | Moore et al. ................... 273/72 |
| 3,877,698 A | 4/1975 | Volpe ............................ 473/520 |

(Continued)

OTHER PUBLICATIONS

Vegas Fastener Manufacture, Mar. 22, 2006, p. 1.*
IDES, Mar. 11, 2006 p. 2.*

*Primary Examiner* — Aarti B Berdichevsky
*Assistant Examiner* — Rayshun Peng
(74) *Attorney, Agent, or Firm* — Terence P. O'Brien

(57) ABSTRACT

A ball bat extending about a longitudinal axis and includes a handle portion, a barrel portion, an injection molded element, and a tubular insert. The handle portion has a generally uniform outer diameter. The barrel portion has proximal and distal regions spaced apart by a central region. The element includes a tubular inner wall defining a longitudinal bore. The element is non-removably attached to the handle member. The element includes a tapered proximal region, a barrel engaging region, and an insert engaging region for engaging the insert. The insert engaging region includes a stop for inhibiting longitudinal movement of the insert. The barrel engaging region non-removably engages the proximal region. The bat having a total length measured from a proximal end of the handle portion to a distal end of the barrel portion. The handle portion has a length that is less than 70 percent of the total length.

18 Claims, 14 Drawing Sheets

(56) References Cited

U.S. PATENT DOCUMENTS

| | | | |
|---|---|---|---|
| 3,897,058 A | 7/1975 | Koch | 273/26 |
| 3,955,816 A | 5/1976 | Bratt | 273/26 |
| 3,963,239 A | 6/1976 | Fujii | 273/72 |
| 4,025,377 A | 5/1977 | Tanikawa | 156/242 |
| 4,032,143 A | 6/1977 | Mueller et al. | 273/72 |
| 4,056,267 A | 11/1977 | Krieger | 273/72 |
| 4,113,248 A | 9/1978 | Yanagioka | 273/172 |
| 4,323,239 A | 4/1982 | Ishii | 273/72 |
| 4,351,786 A | 9/1982 | Mueller | 264/46 |
| 4,505,479 A | 3/1985 | Souders | 273/72 |
| 4,569,521 A | 2/1986 | Mueller | 273/72 |
| 4,572,508 A | 2/1986 | You | 73/72 |
| 4,600,193 A | 7/1986 | Merritt | 273/72 |
| 4,746,117 A | 5/1988 | Noble | 273/72 |
| 4,834,370 A | 5/1989 | Noble et al. | 273/72 |
| 4,848,745 A | 7/1989 | Bohannan et al. | 273/72 |
| 4,898,386 A | 2/1990 | Anderson | 273/26 |
| 4,951,948 A | 8/1990 | Peng | 273/72 |
| 4,961,576 A | 10/1990 | Meredith | 273/72 |
| 5,094,453 A | 3/1992 | Douglas et al. | 273/72 |
| 5,104,123 A | 4/1992 | Okitsu et al. | 273/72 |
| 5,114,144 A | 5/1992 | Baum | 273/72 |
| 5,131,651 A | 7/1992 | You | 73/72 |
| 5,180,163 A | 1/1993 | Lanctot | 273/72 |
| 5,219,164 A | 6/1993 | Peng | 273/72 |
| 5,303,917 A | 4/1994 | Uke | 273/72 |
| D347,671 S | 6/1994 | Weiss et al. | D21/211 |
| 5,380,003 A | 1/1995 | Lanctot | 273/72 |
| 5,409,214 A | 4/1995 | Cook | 473/564 |
| 5,415,398 A | 5/1995 | Eggiman et al. | 273/72 |
| 5,456,461 A | 10/1995 | Sullivan | 273/26 |
| 5,511,777 A | 4/1996 | McNeely | 273/72 |
| 5,516,097 A | 5/1996 | Huddleston | 273/26 |
| 5,593,158 A | 1/1997 | Filice et al. | 473/520 |
| 5,674,138 A | 10/1997 | Nolan | 473/457 |
| 5,676,609 A | 10/1997 | Mollebaek | 473/564 |
| 5,711,726 A | 1/1998 | Powers | 473/453 |
| 5,722,908 A | 3/1998 | Feeney et al. | 473/567 |
| 6,050,908 A | 4/2000 | Muhlhausen | 473/457 |
| 6,056,655 A | 5/2000 | Feeney et al. | 473/567 |
| 6,152,840 A | 11/2000 | Baum | 473/564 |
| 6,173,610 B1 | 1/2001 | Pace | 73/493 |
| 6,280,353 B1 | 8/2001 | Brundage | 473/457 |
| 6,334,824 B1 | 1/2002 | Filice et al. | 473/566 |
| 6,344,007 B1 | 2/2002 | Feeney et al. | 473/567 |
| 6,402,634 B2 | 6/2002 | Lee et al. | 473/223 |
| 6,406,387 B1 | 6/2002 | Ryan | 473/457 |
| 6,432,006 B1 | 8/2002 | Tribble | 473/564 |
| 6,440,017 B1 | 8/2002 | Anderson | 473/566 |
| 6,485,382 B1 | 11/2002 | Chen | 473/566 |
| 6,511,392 B1 | 1/2003 | Chohan | 473/564 |
| 6,547,673 B2 | 4/2003 | Roark | 473/239 |
| 6,569,042 B2 | 5/2003 | LaChance et al. | 473/457 |
| 6,612,945 B1 * | 9/2003 | Anderson | 473/566 |
| D485,876 S | 1/2004 | Andrews | D21/725 |
| 6,702,698 B2 | 3/2004 | Eggiman et al. | 473/566 |
| 6,729,983 B1 | 5/2004 | Vakili et al. | 473/566 |
| 6,743,127 B2 | 6/2004 | Eggiman et al. | 473/567 |
| 6,758,771 B2 | 7/2004 | Tribble | 473/564 |
| 6,761,653 B1 | 7/2004 | Higginbotham et al. | 473/566 |
| 6,808,464 B1 | 10/2004 | Nguyen | 473/566 |
| 6,824,482 B1 | 11/2004 | Tribble | 473/564 |
| 6,875,137 B2 | 4/2005 | Forsythe et al. | 473/566 |
| 6,905,429 B2 | 6/2005 | Forsythe et al. | 473/566 |
| 6,939,237 B1 | 9/2005 | Voden | 473/44 |
| 6,945,886 B2 | 9/2005 | Eggiman et al. | 473/566 |
| 6,969,330 B1 | 11/2005 | Meeker | 473/567 |
| 7,014,580 B2 | 3/2006 | Forsythe et al. | 473/566 |
| 7,033,291 B1 | 4/2006 | Meeker | 473/567 |
| 7,097,578 B2 | 8/2006 | Guenther et al. | 473/567 |
| 7,140,248 B1 | 11/2006 | Brundage | 73/492 |
| 7,140,987 B2 | 11/2006 | Davis et al. | 473/564 |
| 7,140,988 B1 | 11/2006 | Hinman | 473/566 |
| 7,201,683 B2 | 4/2007 | Estape et al. | 473/568 |
| 7,311,620 B1 * | 12/2007 | Heald | A63B 59/50 473/566 |
| 7,381,141 B2 | 6/2008 | Van Nguyen | 473/566 |
| 7,410,433 B2 | 8/2008 | Guenther et al. | 473/567 |
| 7,419,446 B2 | 9/2008 | Nguyen | 473/567 |
| 7,704,159 B1 | 4/2010 | McDonald | 473/296 |
| 7,749,115 B1 | 7/2010 | Cruz et al. | 473/567 |
| 7,909,705 B2 | 3/2011 | Gill et al. | 473/297 |
| 7,942,764 B2 | 5/2011 | Chung | 473/564 |
| 7,955,200 B1 | 6/2011 | Cruz et al. | 473/567 |
| 7,980,970 B2 | 7/2011 | Watari et al. | 473/566 |
| 7,985,149 B2 | 7/2011 | Watari et al. | 473/566 |
| 8,052,547 B2 | 11/2011 | Nusbaum et al. | 473/457 |
| 8,197,365 B2 | 6/2012 | Tokieda | 473/566 |
| 8,317,640 B1 | 11/2012 | Cruz et al. | 473/567 |
| 8,348,862 B2 | 1/2013 | Chu | 600/587 |
| 8,425,353 B2 | 4/2013 | Jones et al. | 473/564 |
| 8,512,174 B2 | 8/2013 | Epling et al. | 473/567 |
| 8,512,175 B2 * | 8/2013 | Epling et al. | 473/567 |
| 2002/0072436 A1 | 6/2002 | Liu | 473/457 |
| 2004/0224801 A1 | 11/2004 | Forsythe et al. | 473/564 |
| 2005/0143203 A1 * | 6/2005 | Souders | A63B 59/50 473/564 |
| 2006/0276275 A1 * | 12/2006 | Guenther et al. | 473/564 |
| 2007/0207882 A1 | 9/2007 | Van Nguyen | 473/564 |
| 2011/0111894 A1 * | 5/2011 | Thouin | 473/564 |
| 2011/0124447 A1 | 5/2011 | Chauvin et al. | 473/566 |
| 2011/0195808 A1 | 8/2011 | Chauvin | 473/564 |
| 2012/0178558 A1 * | 7/2012 | Tsukamoto et al. | 473/566 |

\* cited by examiner

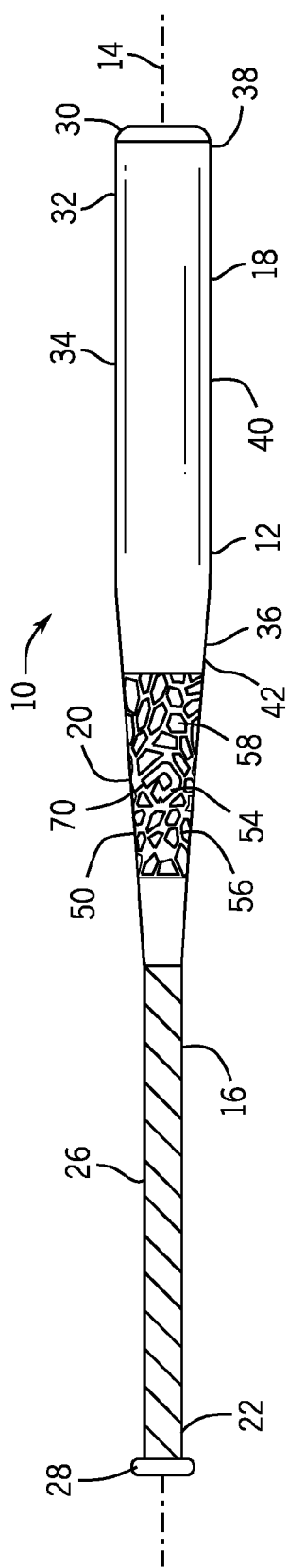
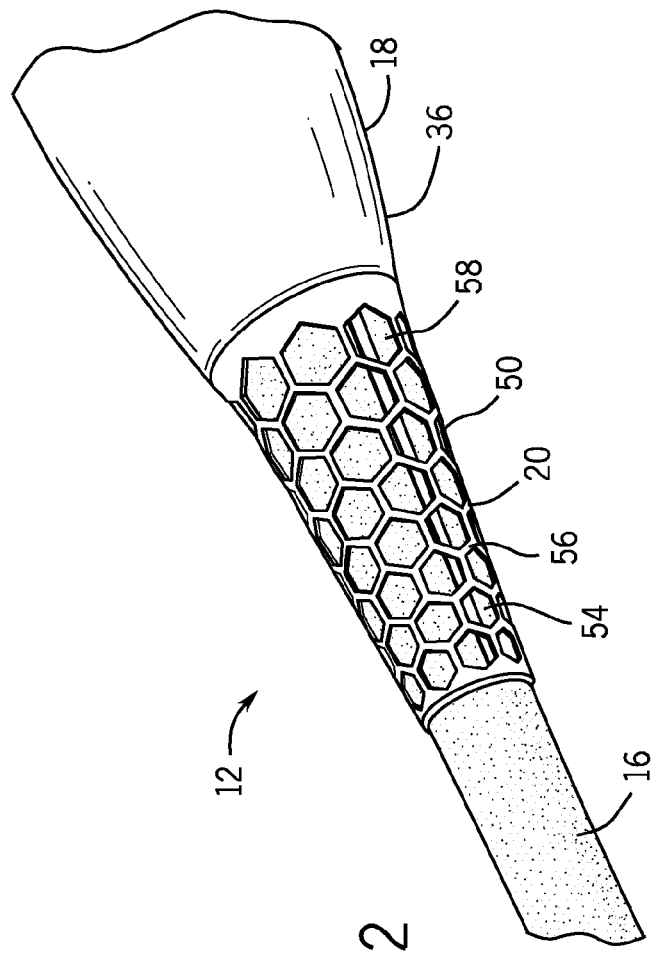
FIG. 1
FIG. 2

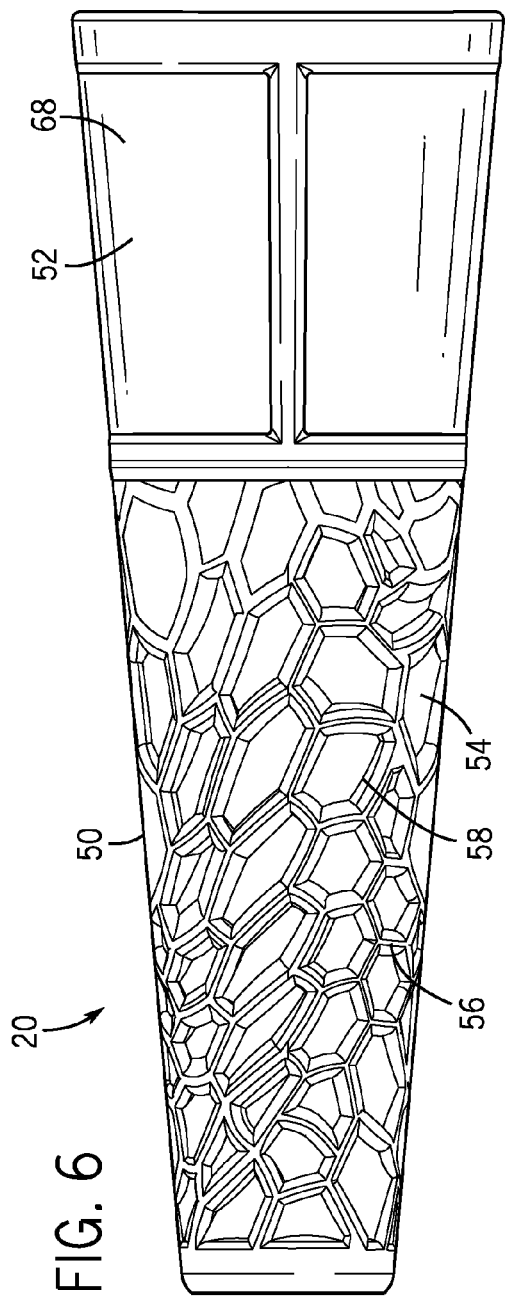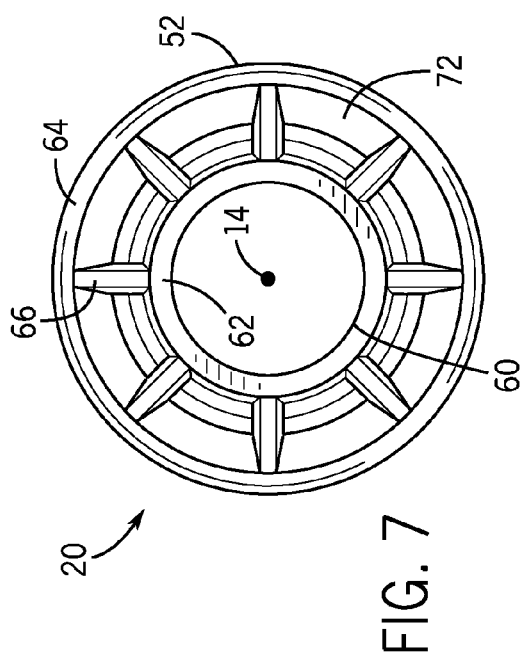

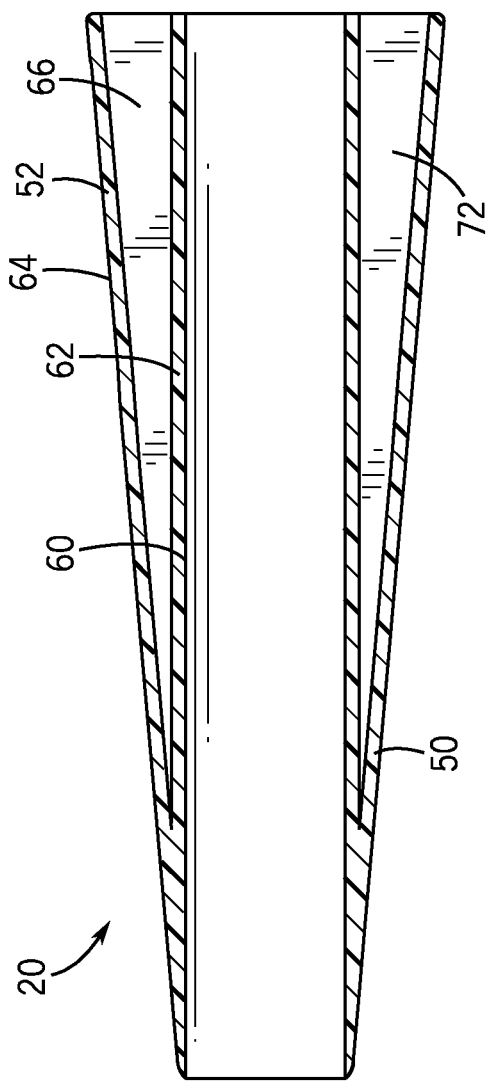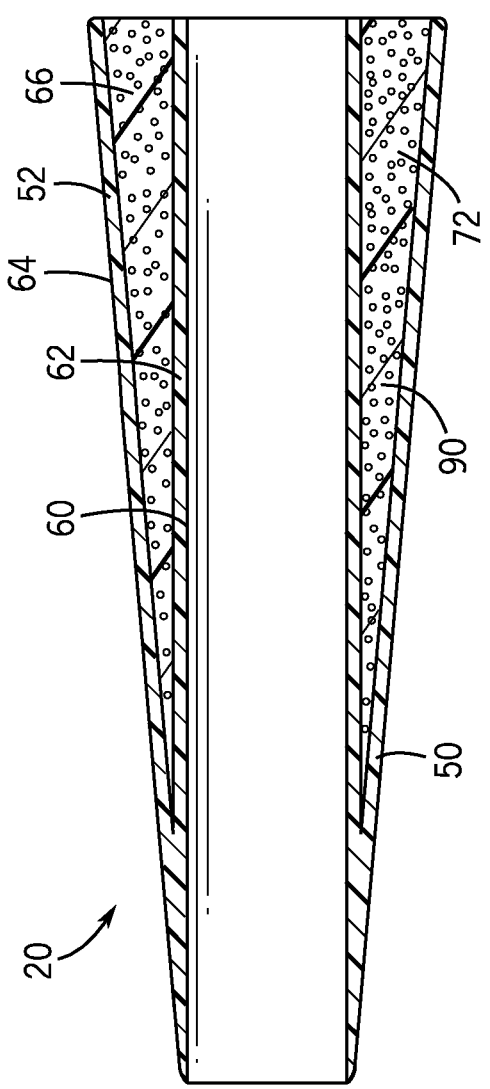

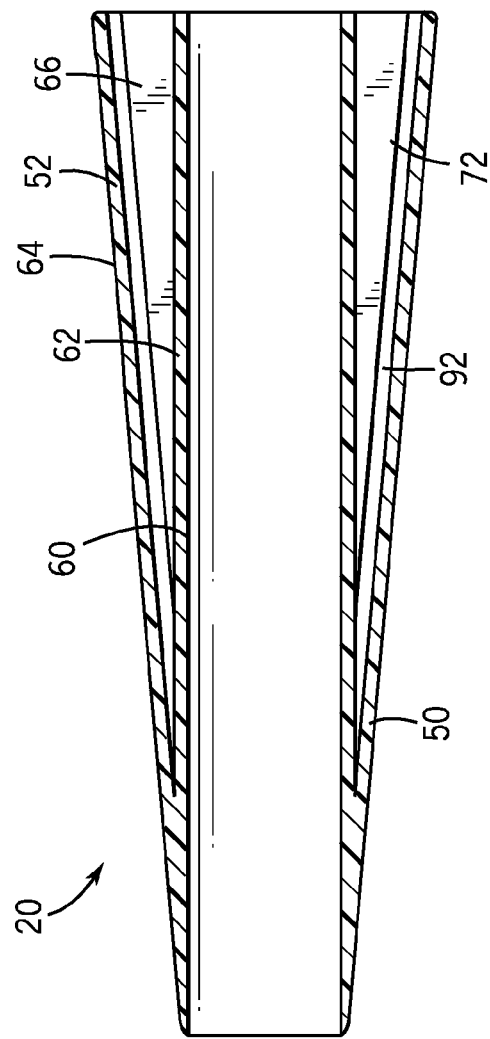
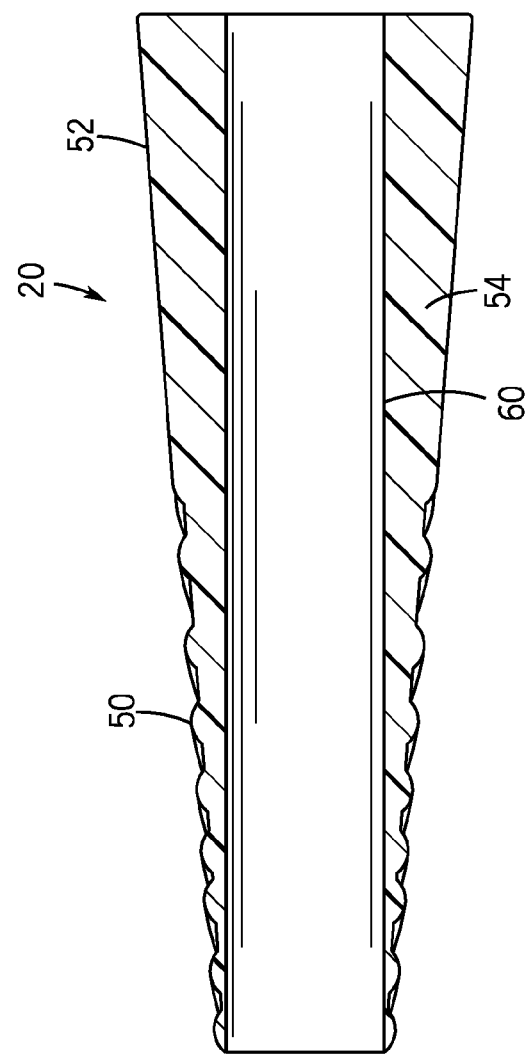

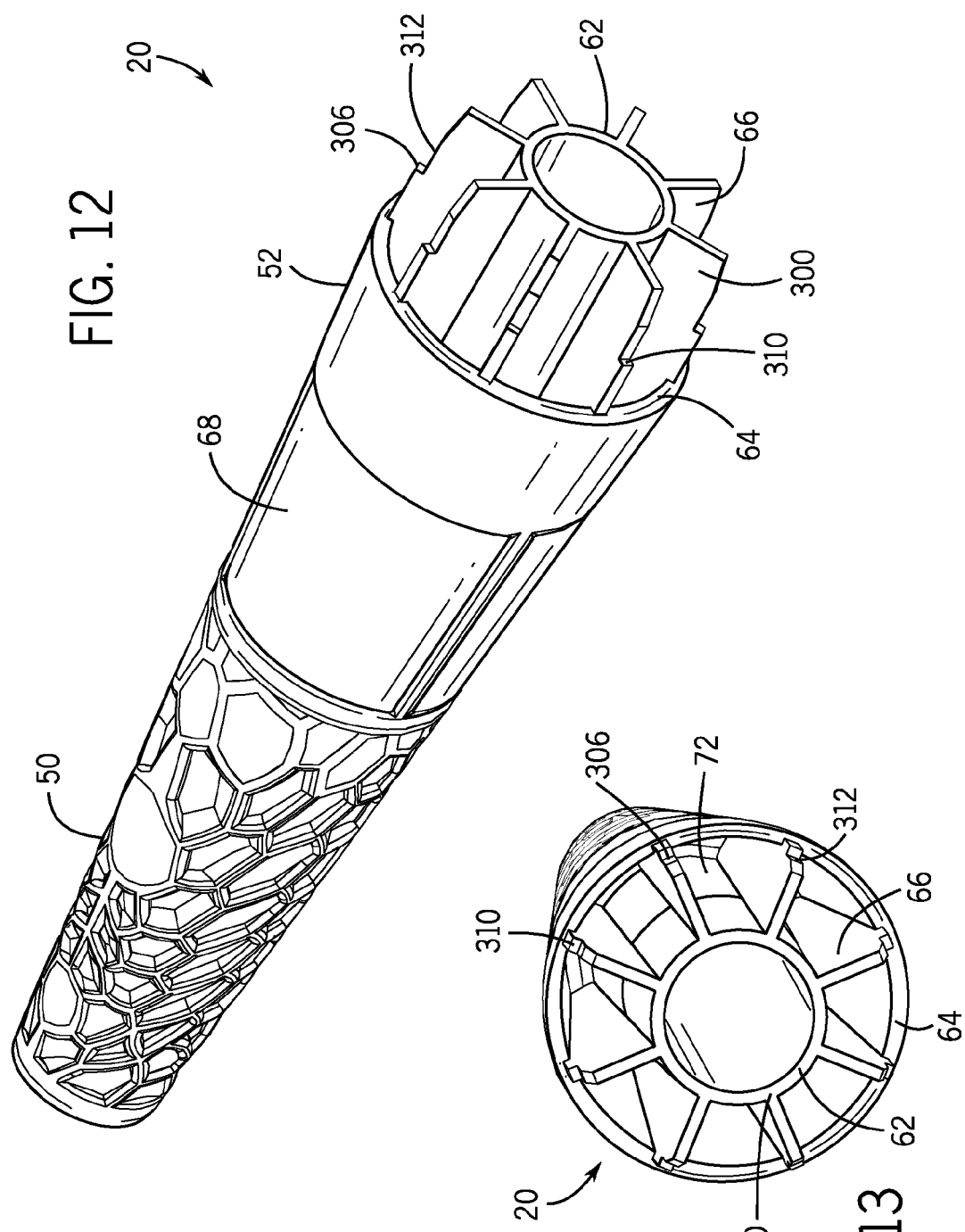
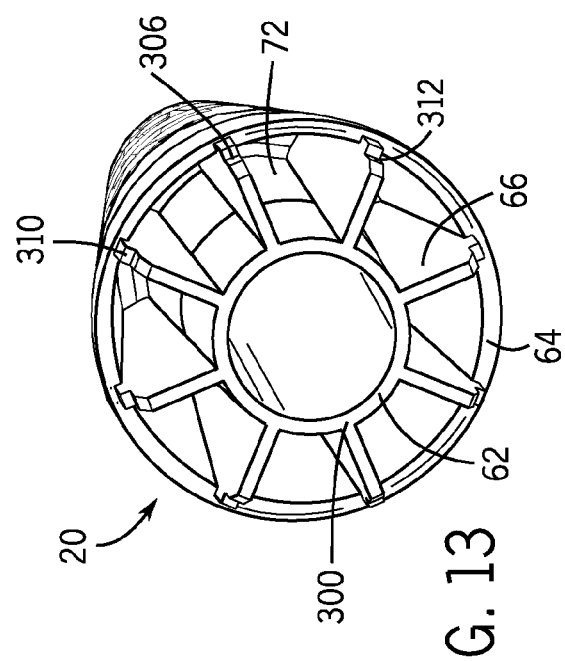

TAPERED ISOLATING ELEMENT FOR A BALL BAT AND SYSTEM FOR USING SAME

RELATED U.S. APPLICATION DATA

The present invention claims the benefit of the filing date under 35 U.S.C. §119(e) of U.S. Provisional Patent Application Ser. No. 61/756,089, filed on Jan. 24, 2013, which is hereby incorporated by reference in its entirety. The present application is related to co-pending U.S. patent application Ser. Nos. 14/041,227, 14/041,481, and 14/041,707 filed on the same day herewith, the full disclosure of which is hereby incorporated by reference.

FIELD OF THE INVENTION

The present invention relates to an element for coupling a handle portion to a barrel portion of a ball bat, and a system and method of customizing a ball bat.

BACKGROUND OF THE INVENTION

Baseball and softball bats are well known sporting goods. The materials used to form bats have changed and become more varied overtime, including materials such as wood, aluminum, other alloys, fiber composite materials and combinations thereof. Additionally, the construction of ball bats has also evolved and become more varied overtime. For example, many current ball bats are formed of separate handle and barrel portions. In many instances, the incorporation of new materials and compositions for ball bats has led to increased durability, reliability and performance. The new materials and compositions have also increased the number of bat configurations and choices available to ball players. Still further, the number of baseball and/or softball organizations has also increased overtime. Such baseball and softball organizations periodically publish and update equipment standards and/or requirements including performance limitations for ball bats.

The current state of ball bats includes some drawbacks. The cost of many existing bat constructions can be very high due to the complexity of the construction, the cost of the materials, and the time required to produce the finished ball bat. The wide variety of bat constructions and materials can make it difficult for bat retailers to know which bats to stock. Additionally, many bat models have long production lead times. Additionally, although bat construction and composition has evolved and become more varied overtime, many ball bats still provide excessive shock and/or vibration to the player upon hitting a ball, particularly on off-center impacts or impacts away from the sweet spot of the ball bat.

Accordingly several needs still exist in the ball bat industry. A need exists for bat configurations that provide exceptional performance, durability and reliability characteristics without excessive material and/or manufacturing costs. What is needed is a bat construction that offers more design flexibility and exceptional performance in a cost effective and efficient manner. It would be desirable to provide a bat construction and system that is cost effective, allows for customization of the bat, short production lead times and exceptional performance. A need exists for a ball bat that provides exceptional feel to the player, even upon off center impacts with the ball. It would also be advantageous to provide an efficient, easy to use tool, system or method that would allow a user to customize his or her bat and obtain a bat that matches that player's particular needs including design, skill level, performance and durability. It is also desirable to provide a ball bat with a unique appealing appearance that looks great and performs well.

SUMMARY OF THE INVENTION

The present invention provides a ball bat extending about a longitudinal axis. The bat includes a handle portion, a barrel portion, and an injection molded element non-removably attached to the handle member. The handle portion has a generally uniform outer diameter with respect to the longitudinal axis. The barrel portion has a proximal region and a distal region spaced apart by a central region. The element has a tapered proximal region and barrel engaging region. The barrel engaging region of the element non-removably engages the proximal region of the barrel portion. The bat has a total length measured from a proximal end of the handle portion to a distal end of the barrel portion. The handle portion has a length that is less than 70 percent of the total length.

According to a principal aspect of a preferred form of the invention, a ball bat extending along a longitudinal axis. The bat includes a handle portion, a barrel portion and an element coupled to the handle portion. The handle portion has a generally uniform outer diameter with respect to the longitudinal axis. The barrel portion has a proximal region and a distal region spaced apart by a central region. The element has a tapered proximal region and barrel engaging region. The element further includes a tubular wall that defines a longitudinal bore for receiving the handle member, and an outer wall extending over at least a portion of the length of the element. The outer wall is spaced apart from the tubular wall by at least one rib. The barrel engaging region of the element non-removably engages the proximal region of the barrel portion. The bat has a total length measured from a proximal end of the handle portion to a distal end of the barrel portion. The handle portion has a length that is less than 70 percent of the total length.

According to another preferred aspect of the invention, a ball bat extends along a longitudinal axis and includes a handle portion, a barrel portion, an injected molded element non-removably attached to the handle member, and a tubular insert. The handle portion has a generally uniform outer diameter with respect to the longitudinal axis. The barrel portion has a proximal region and a distal region spaced apart by a central region. The element includes a tubular inner wall defining a longitudinal bore. The element is non-removably attached to the handle member, and includes a tapered proximal region, a barrel engaging region, and an insert engaging region. The tubular insert is engaged with the insert engaging region of the element. The insert engaging region includes a stop for engaging the insert and inhibiting longitudinal movement of the insert in a proximal direction. The barrel engaging region of the element non-removably engaging the proximal region of the barrel portion. The bat has a total length measured from a proximal end of the handle portion to a distal end of the barrel portion, and the handle portion has a length that is less than 70 percent of the total length.

According to another preferred aspect of the invention, a method for enabling a user to customize a ball bat using an electronic device having a processor, a display operably coupled to the processor, an input mechanism, and a memory operably coupled to the processor. The method includes the steps of presenting to the user on the display of the electronic device representations of a plurality of handle portions of the ball bat. The plurality of handle portions vary from one another according to at least one handle portion characteristic. The handle portion characteristic can be length, outer diameter, weight, color, resistance to bending, strength, wall thickness, material, or combinations thereof. The method further includes receiving user input through the input mechanism selecting the one of the plurality of handle portions, and presenting to the user on the display of the electronic device representations of a plurality of barrel portions of the ball bat. Each of the barrel portions has an outer diameter and a length. The plurality of barrel portions varies from one another according to at least one barrel portion characteristic. The barrel portion characteristic can be length, weight, weight distribution, nominal outer diameter, maximum outer diameter, wall thickness, strength, model name, color, stiffness, material, or combinations thereof. The method further includes receiving user input through the input mechanism selecting the one of the plurality of barrel portions, and presenting to the user on the display of the electronic device representations of a plurality of elements. The element is configured to fixedly engage to the handle portion and to fixedly engage to the barrel portion. The plurality of elements varies from one another according to at least one element characteristic. The element characteristic can be length, weight, color, color pattern, texture, tactile feel, material, material hardness, and combinations thereof. The method further includes the steps of receiving user input through the input mechanism selecting the one of the plurality of elements, presenting a representation of the ball bat in an assembled state on the display with the selected handle portion, barrel portion and element included in the representation, and receiving user input through the input mechanism confirming the selection of the handle portion, the barrel portion and the element.

According to another preferred aspect of the invention, a system for customizing a ball bat for a user includes a processor, a display operably coupled to the processor, an input mechanism, and a memory operably coupled to the processor. The ball bat includes a handle portion, a barrel portion and an element. The electronic device is configured to provide at least first, second third and fourth user interfaces to the user. The first user interface includes a representation of at least one handle portion of the ball bat. The first user interface is configured to enable the user to select or vary at least one handle portion characteristic. The handle portion characteristic can be length, outer diameter, weight, color, resistance to bending, strength, wall thickness, material, or combinations thereof. The second user interface includes a representation of at least one barrel portion of the ball bat. The second user interface is configured to enable the user to select or vary at least one barrel portion characteristic of the barrel portion of the ball bat. The barrel portion characteristic can be length, weight, weight distribution, nominal outer diameter, maximum outer diameter, wall thickness, strength, model name, color, stiffness, material, or combinations thereof. The third user interface includes a representation of at least one element of the ball bat. The element is configured to fixedly engage to the handle portion and to fixedly engage to the barrel portion. The third user interface is configured to enable the user to select or vary at least one element characteristic of the element of the ball bat. The element characteristic can be length, weight, color, color pattern, texture, tactile feel, material, material hardness, or combinations thereof. The fourth user interface includes a representation of the ball bat including the handle portion, the barrel portion and the element. The input mechanism is configured to enable the user to confirm the selected combination of the handle portion, the barrel portion and the element.

This invention will become more fully understood from the following detailed description, taken in conjunction with the accompanying drawings described herein below, and wherein like reference numerals refer to like parts.

BRIEF DESCRIPTION OF THE DRAWINGS

FIG. 1 is a side view of a ball bat in accordance with a preferred embodiment of the present invention.

FIG. 2 is a side perspective view of the coupling of a handle portion and a barrel portion of the bat in accordance with a preferred embodiment of the present invention.

FIG. 6 is a side view of the tapered element of FIG. 4.

FIG. 7 is a distal end view of the tapered element of FIG. 4.

FIG. 8a is a longitudinal cross-sectional view of the tapered element of FIG. 4.

FIGS. 8b through 8c illustrate longitudinal cross-sectional views of a tapered element of a ball bat in accordance with alternative preferred embodiments of the present invention.

FIG. 9 is longitudinal cross-sectional view of a tapered element of a ball bat in accordance with another alternative preferred embodiment of the present invention.

FIG. 12 is a side perspective view of a tapered element in accordance with an alternative preferred embodiment of the present invention.

FIG. 13 is a distal end perspective view of the element of FIG. 12.

DETAILED DESCRIPTION OF THE INVENTION

Figure 3:
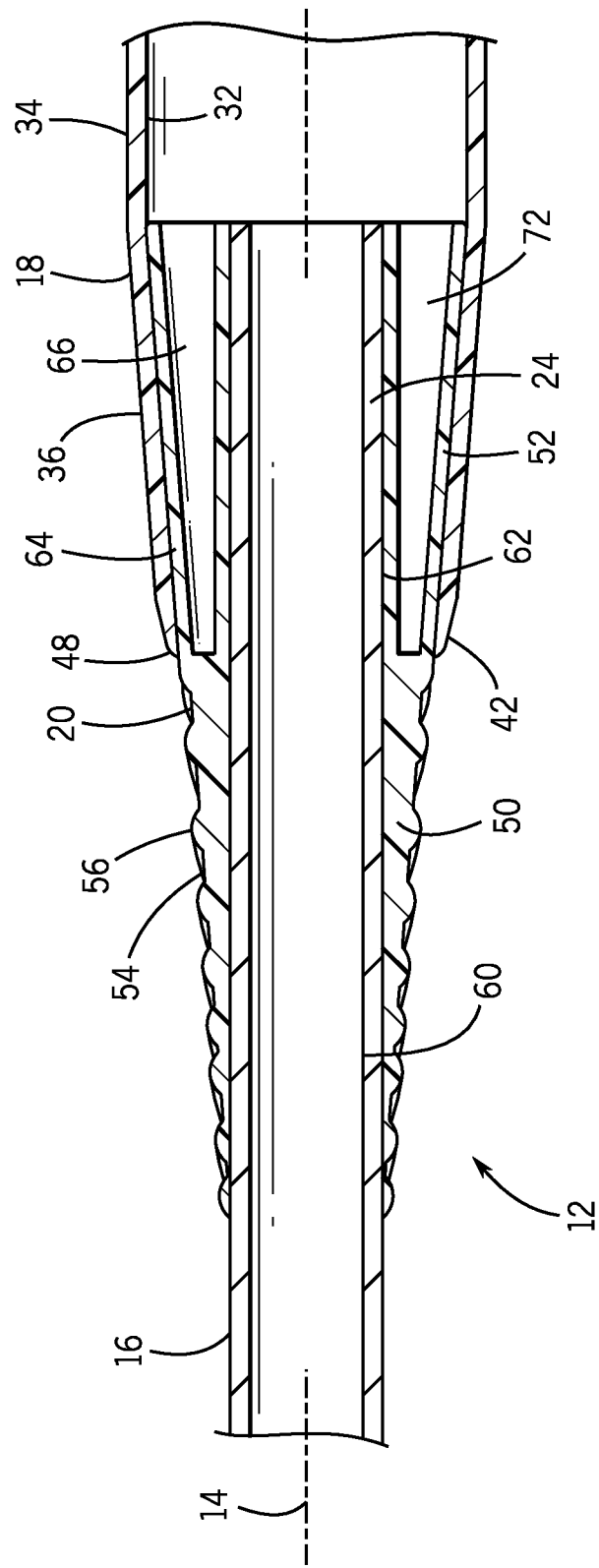
FIG. 3 is a longitudinal cross-sectional view of the coupling of the handle portion of the bat to the barrel portion of the ball bat of FIG. 1.

Referring to FIG. 1, a ball bat is generally indicated at 10. The ball bat 10 of FIG. 1 is configured as a baseball bat; however, the invention can also be formed as a softball bat, a rubber ball bat, or other form of ball bat. The bat 10 includes a frame 12 extending along a longitudinal axis 14. The tubular frame 12 can be sized to meet the needs of a specific player, a specific application, or any other related need. The frame 12 can be sized in a variety of different weights, lengths and diameters to meet such needs. For example, the weight of the frame 12 can be formed within the range of 15 ounces to 36 ounces, the length of the frame can be formed within the range of 24 to 36 inches, and the maximum diameter of the barrel portion 18 can range from 1.5 to 3.5 inches.

The frame 12 has a relatively small diameter handle portion 16, a relatively larger diameter barrel portion 18 (also referred as a hitting or impact portion), and an intermediate tapered element 20. The handle and barrel portions 16 and 18 and the intermediate tapered element 20 are formed as separate structures, which are connected or coupled together. This multi-piece frame construction enables each of the three components to be formed of different materials or similar materials to match a particular player need or application.

Referring to FIGS. 1 and 3, the handle portion 16 is an elongate tubular structure that extends along the axis 14 and has a proximal end region 22 and a distal end region 24. Preferably, the handle portion 16 is sized for gripping by the user and includes a grip 26, which is wrapped around and extends longitudinally along the handle portion 16, and a knob 28 connected to the proximal end 22 of the handle portion 16. The distal end region 24 is coupled to the element 20. The handle portion 16 is preferably a cylindrical structure having a uniform outer diameter along its length. The handle portion 16 can also have a uniform inner diameter along its length. In other implementations, the handle portion can be formed with a non-uniform inner diameter, and/or a non-uniform outer diameter along its length. In other implementations, the handle portion can be a non-hollow elongate member. In other implementations, the handle portion may have a non-cylindrical shape. The handle portion 16 is formed of a strong, generally flexible, lightweight material, preferably a fiber composite material. Alternatively, the handle portion 16 can be formed of other materials such as an aluminum alloy, a titanium alloy, steel, other alloys, a thermoplastic material, a thermoset material, wood or combinations thereof. In other alternative embodiments, the handle can have slightly tapered or non-cylindrical shapes.

The barrel portion 18 of the frame 12 is "tubular," "generally tubular," or "substantially tubular," each of these terms is intended to encompass softball style bats having a substantially cylindrical impact (or "barrel") portion as well as baseball style bats having barrel portions with generally frusto-conical characteristics in some locations. Alternatively, other hollow, tubular shapes can also be used. The barrel portion 18 extends along the axis 14 and has an inner surface 32 and an outer surface 34. The barrel portion 18 includes a proximal region 36, a distal region 38 spaced apart by a central region 40. The barrel portion 18 is configured for impacting a ball (not shown), and preferably is formed of strong, durable and resilient material, such as, an aluminum alloy. In alternative preferred embodiments, the proximal member 36 can be formed of one or more composite materials, a titanium alloy, a scandium alloy, steel, other alloys, a thermoplastic material, a thermoset material, wood or combinations thereof.

As used herein, the terms "composite material" or "fiber composite material" refer to a plurality of fibers impregnated (or permeated throughout) with a resin. In one preferred embodiment, the fibers can be systematically aligned through the use of one or more creels, and drawn through a die with a resin to produce a pultrusion, as discussed further below. In an alternative preferred embodiment, the fibers can be co-axially aligned in sheets or layers, braided or weaved in sheets or layers, and/or chopped and randomly dispersed in one or more layers. The composite material may be formed of a single layer or multiple layers comprising a matrix of fibers impregnated with resin. In particularly preferred embodiments, the number layers can range from 3 to 8. In other implementations, more than 8 layers can be used. In multiple layer constructions, the fibers can be aligned in different directions (or angles) with respect to the longitudinal axis 14 including 0 degrees, 90 degrees and angular positions between 0 to 90 degrees, and/or in braids or weaves from layer to layer. For composite materials formed in a pultrusion process, the angles can range from 0 to 90 degrees. In some implementations, the layers may be separated at least partially by one or more scrims or veils. When used, the scrim or veil will generally separate two adjacent layers and inhibit resin flow between layers during curing. Scrims or veils can also be used to reduce shear stress between layers of the composite material. The scrim or veils can be formed of glass, nylon or thermoplastic materials. In one particular embodiment, the scrim or veil can be used to enable sliding or independent movement between layers of the composite material. The fibers are formed of a high tensile strength material such as graphite. Alternatively, the fibers can be formed of other materials such as, for example, glass, carbon, boron, basalt, carrot, Kevlar®, Spectra®, poly-para-phenylene-2,6-benzobisoxazole (PBO), hemp and combinations thereof. In one set of preferred embodiments, the resin is preferably a thermosetting resin such as epoxy or polyester resins. In other sets of preferred embodiments, the resin can be a thermoplastic resin. The composite material is typically wrapped about a mandrel and/or a comparable structure (or drawn through a die in pultrusion), and cured under heat and/or pressure. While curing, the resin is configured to flow and fully disperse and impregnate the matrix of fibers.

The bat 10 further includes an end cap 30 attached to the distal region 38 of the barrel portion 18 to substantially enclose the distal region 38. In one preferred embodiment, the end cap 30 is bonded to the distal region 38 through an epoxy. Alternatively, the end cap can be coupled to the distal region through other adhesives, chemical bonding, thermal bonding, an interference fit, other press-fit connections and combinations thereof.

Referring to FIGS. 1 and 3 through 7, a preferred embodiment of the intermediate tapered element 20 is shown in greater detail. The element 20 is a transitional member that connects the handle portion 16 to the barrel portion 18. In one preferred embodiment, the element 20 includes a tapered proximal region 50 and a barrel engaging region 52. In particularly preferred embodiments, the barrel engaging region 52 can also be tapered similar to the proximal region 50 such that the element has a frustoconical shape.

The element 20 can be formed of a single material, or two or more different materials. In one preferred embodiment, the element 20 includes a base layer 54 formed of a first material and an outer layer 56 formed of a second material. The first and second materials are preferably formed of lightweight, tough, durable materials, such as engineered thermoplastic polyurethane (ETPU). Alternatively, the first and second materials can be formed of other materials, such as thermoplastic materials, thermoset materials, a composite material, a fiber composite material, aluminum, an alloy, wood, and combinations thereof. The first material preferably has a durometer value (hardness value) within the range of 45 on the Shore D hardness scale to 150 on the Shore R hardness scale. In a particularly preferred embodiment, the first material has a durometer value within the range of 100 to 140 on the Shore R hardness scale. One important aspect of the present invention is that although the first material of the element 20 is formed of a hard material, the element 20 significantly reduces the level of undesirable vibrational and shock energy extending from the barrel portion 18 to the handle portion 16 upon impact with a ball.

The second material preferably has a durometer value within the range of 20 on the Shore A scale to 120 on the Shore R scale. In a particularly preferred embodiment, when the element is formed with a second material, the second material has a durometer within the range of 20 to 90 on the Shore A scale. The first and second materials can be different materials or the same material but with different characteristics, such as hardness. The first material is preferably harder or has a Shore durometer value that is greater than the second material. In an alternative preferred embodiment, the first and second materials can have the same or similar hardness values. In another alternative embodiment, the second material can have a hardness value that is greater than the first material.

Incorporation of the outer layer 56 provides additional design flexibility to the element. In embodiments where the second material of the outer layer 56 has a lower durometer value than the base layer 54, the outer layer 56 has a different feel when touched compared to the feel of the base layer 54 or other components of the bat 10. The outer layer 56 may be continuous and entirely cover the base layer 54, or the outer layer 56 can be formed into a variety of different shapes or patterns with portions of the base layer 54 visible through one or more openings 58 defined in the outer layer 56. FIG. 1, FIG. 2 and FIGS. 4-6 illustrate three separate examples of configurations of the outer layer 56 wherein portions of the base layer 54 are visible through the openings 58 in the outer layer 56. The three examples are representative samples and are not intended to be limiting. The present invention contemplates the use of other designs, patterns, shapes, and graphical and/or alphanumeric indicia. In one preferred embodiment, the outer layer 56 can be configured to form graphical and/or alphanumeric indicia 70 representative of a trademark (such as, for example, the DeMarini® "D" registered trademark), a service mark, a design, a logo, a certification mark, a warning, an instruction, other markings or combinations thereof. The outer layer 56 is preferably slightly raised with respect to the base layer 54 such that the graphic, design or pattern taken by the outer layer 56 is more pronounced, three dimensional and visible. Additionally, the base layer 54 can be formed in one color or multiple colors, and the outer layer 56 can be formed in a different color, or a different combination of colors. In other preferred embodiments, the base layer 54 and the outer layer 56 can use the same color or the same color combinations. The outer layer 56 can also have a different texture than the base layer 54.

The element 20 is preferably an injection molded member produced in an injection mold or in an operation using an injection molding apparatus. The injection molding apparatus can include an injection mold having a mold cavity that defines the shape of the element 20 (or one half of the element). In one preferred embodiment, the element 20 is injection molded over the handle portion 16. The handle portion 16 extends within the mold (and essentially forms part of the mold) and the first material of the element 20 is injection molded about the handle portion. The injection molding of the element 20 over the handle portion 16 is referred to as over-molding of the element 20 to the handle portion 16. The mold can be a split mold having two major sections. The thermoplastic material can be injected into the mold cavity from an injection molding extruder. The thermoplastic material can be supplied through an inlet tube to the interior of the extruder, which is heated to reduce the viscosity of the thermoplastic material and make it flowable. A piston or screw can be used to force the flowable thermoplastic material out of the extruder into a manifold system, which can be heated. The manifold system can include one, two, three or more flow paths for routing the flowable thermoplastic material to injection ports. The locations of the injection ports are preferably spaced apart to enable the thermoplastic material to readily flow and fill the mold cavity in an efficient and timely manner. The injection of the flowable thermoplastic material can be performed in stages through the use of one or more valves. One or more sensors, such as pressure and/or temperature sensors, can be utilized with the mold to determine when the flowable thermoplastic material has reached selected locations within the mold cavity. When the flow of the thermoplastic material reaches a predetermined value, such as a predetermined pressure at one of the pressure sensors, the valve can reposition and reroute or redirect the flow of the thermoplastic material down a second flowpath through a second injection port. In alternative preferred embodiments, other forms of injection mold apparatuses can be used. The type of mold, the number of flow paths, the number of injections ports or gates, the number of valves, the configuration of the valves, the type of extruder or other injection mechanism, the configuration, pressure, temperature and order of the flow and introduction of the thermoplastic material can be varied. The injection molding apparatus described above is one example and is not intended to be limiting. One of skill in the art understands that a wide variety of injection molding apparatuses can be used to achieve the desired result from injection molding process or operation.

In one preferred embodiment, the distal end region 24 of the handle portion 16 can be inserted into the injection mold such that the element 20 is injection molded around the distal end region 24. The distal end region 24 of the handle portion 16 can be unfinished and roughened to enhance the bonding from the molding of the element 20 to the region 24. The over-molding of the element 20 to the distal end region 24 of the handle region 16 produces an exceptional bond between the two components. As the injection molded first material of element 20 cures it shrinks slightly and further increases the bond strength of the element 20 to the handle portion 16. Accordingly, the element 20 is shrink-fit to the handle portion 16. Importantly, in the over-molding process, no separate adhesive or additional fastener is required. Therefore, in a preferred embodiment, the element 20 is over-molded to the handle portion 16 without the use of a separate adhesive or one or more mechanical fasteners. The bonding and shrinkage of the first material of the element 20 to the handle portion 16 provides and exceptionally strong connection. Empirical testing of the bond of the element 20 to the distal end region 24 found a resistance to separation of the element 20 molded to the handle portion 16, even when placed under a 5000 lbf load.

In an alternative preferred embodiment, the element can be molded or injection molded apart from the handle portion and attached to the handle portion after it has been formed. In still other preferred embodiments, the element can be coupled to the handle portion by one or more intermediate layers of material, adhesives, and/or fasteners.

When the element 20 is formed with a base layer 54 and an outer layer 56, the outer layer 56 is preferably over-molded to the base layer 54. The base layer 54 is initially molded and allowed to cure. The base layer 54 is then placed into a secondary mold where the outer layer 56 is over-molded over the base layer 54. The over-molding operation provides an exceptional bond between the base layer 54 and the outer layer 56. The second material of the outer layer 56 flows and fills the secondary mold about the base layer 54 to form the element 20. The first and second materials may be hydroscopic to some degree. Therefore, it is preferable for the over-molding of the outer layer 56 to the base layer 54 to occur relatively soon after the base layer 54 has cured.

The distal ends of the element 20 and the handle portion 16 may terminate at the same point along the axis 14. Alternatively, the distal end region 24 of the handle portion 16 may extend slightly further than the element 20, such that a small amount of the distal end region 24 extends beyond the distal end of the element 20. In another alternative preferred embodiment, the element 20 may extend slightly beyond the distal end region 24 of the handle portion 16. In an alternative preferred embodiment, the element 20 can be injection molded in two pieces, then placed about the distal end region 24 and molded to the distal end region 24 under heat and pressure in a separate mold.

In alternative embodiments, the element 20 may be connected to the handle portion 16 through chemical bonding, thermal bonding, one or more fasteners, an adhesive layer, an intermediate bonding layer, or combinations thereof.

Figure 4:
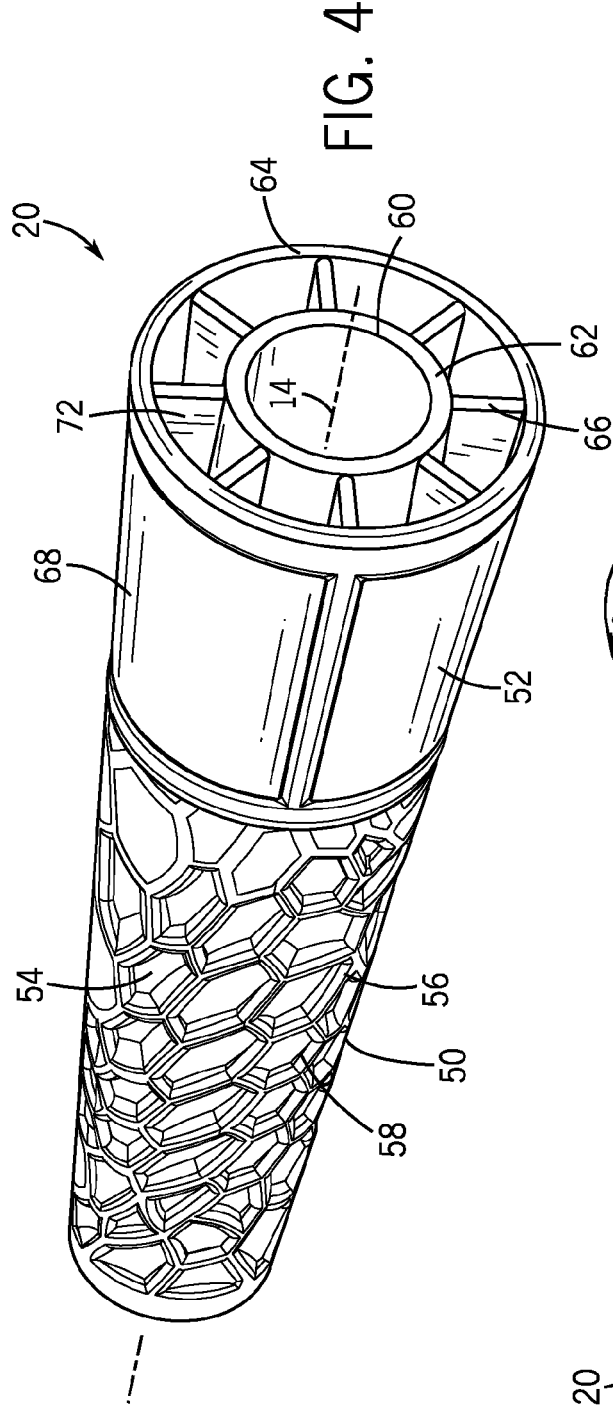
FIG. 4 is a side perspective view of a tapered element of the ball bat of FIG. 1.

Referring to FIGS. 3 through 7, the element 20 defines a longitudinally extending through-bore 60 for receiving the handle portion 16. The barrel engaging region 52 of the element 20 can include a tubular wall 62 that also defines the bore 60, and an outer wall 64 that is spaced apart from the tubular wall 62 by at least one rib 66. The rib 66 can extend radially with respect to the axis 14 from the tubular wall 62 to the outer wall 64. In a preferred embodiment, the tubular wall 62 and the outer wall 64 define one or more cavities 72 between the ribs 66, or between the tubular wall 62 and the outer wall 64. The cavities 72 preferably extend at least 40 percent of the length of the element 20. In alternative preferred embodiments, the cavities can extend over less than 40 percent of the length of the element 20 or more than 40 percent of the length of the element 20. In FIGS. 4 and 7, the element 20 is shown with eight ribs 66. In alternative preferred embodiments, the number of ribs 66 can be one, two, three, four, five or more. Preferably, the ribs 66 are evenly spaced or angled apart about the element 20. The ribs 66 provide structural integrity to the element 20 while allowing less material to be used, reduced weight and lower material cost to produce the element 20.

Figure 5:
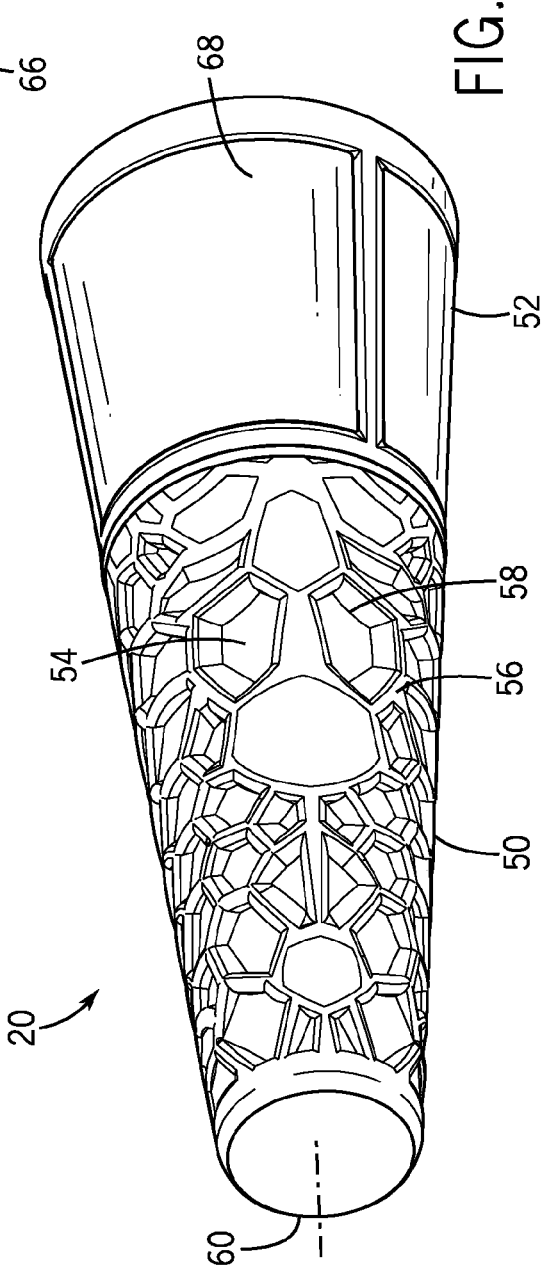
FIG. 5 is another side perspective view of the tapered element of FIG. 4.

Referring to FIGS. 4 through 6, the barrel engaging portion 52 of the element 20 preferably has a generally tapered or frustoconical shape. The outer surface of the barrel engaging portion 52 preferably defines a plurality of recesses 68. The recesses 68 facilitate the engagement of the barrel engaging portion 52 to the proximal end region 36 of the barrel portion 18 by allowing excess adhesive or other bonding agent to flow within the recess 68 and cure. The recesses 68 facilitate the flow of such adhesives, particularly fast curing adhesives, during the assembly process. The recesses 68 can provide for a more efficient, and/or varied bond line between the barrel engaging portion 52 of the element 20 and the proximal end region 36 of the barrel portion 18. In one particularly preferred embodiment, one or more locations of the barrel engaging portion 52 between the recesses 68 may directly contact the proximal end region 36 while the adhesive fills the recesses to bond the element 20 to the proximal end region 36. Three recesses 68 are shown in the preferred embodiment of FIGS. 4 through 6. However, in alternate preferred embodiments, other numbers of recesses can be used. In other alternative preferred embodiments, the shape and/or size of the recesses can be varied into one or more different shapes, and/or the depth of the recesses can be varied one or more different depth or variable depths. In another alternative preferred embodiment, the barrel engaging portion can be formed with a plurality of projections to facilitate the engagement of the element to the barrel portion. In another alternative preferred embodiment, the barrel engaging portion can be formed with one or more recesses or without one or more projections.

Referring to FIGS. 1 through 3, the frustoconical shape of the barrel engaging region 52 of the element 20 diverges outwardly from the axis 14. The frusto-conical shaped barrel engaging region 52 preferably telescopically engages the proximal end region 36 of the barrel portion 18. The proximal region 36 of the barrel portion 18 generally converges toward the axis 14 to form a frusto-conical shape that is complementary to the shape of the barrel engaging region 52 thereby providing a telescopic interlocking mechanical engagement. The engagement can include an adhesive.

The element 20 is preferably formed as a one piece integral structure that connects the handle portion 16 to the barrel portion 18. The element 20 preferably completely isolates the barrel portion 18 from the handle portion 16 such that no direct contact exists between the handle portion 16 and the barrel portion 18. The one-piece, integral structure means that once formed the element cannot be disassembled into two or more pieces. The one-piece, integral structural cannot be separated into two or more pieces without essentially destroying the element 20. By way of example, the knob 28 and end cap 30 of a ball bat are typically not integral to the bat frame. The knob 28 and/or the end cap 30 can often be removed without destroying either component. If two portions, parts or components of a bat can be separated by removing one or more fasteners, and/or by removing, dissolving or otherwise separating a separate adhesive, the portions, parts or components do not form a one-piece, integral structure. The element 20 reduces unwanted shock and/or vibrational energy generated from impact of the barrel portion 18 with a pitched ball from as it extends up and along the frame 12 to the user's hands. The transition from the dissimilar materials of the barrel portion 18, the element 20 and the handle portion 16 further contributes to dampen or lessen the severity of the shock and/or vibrational energy felt by the batter holding the handle portion 16 during or immediately following impact with the ball. The engagement of the handle to the element and the element to the barrel portion is preferably a non-threaded engagement.

Significantly, the element 20 of the present invention can be configured to essentially decouple vibration and/or shock dampening from stiffness. Generally speaking, if one wished to reduce the shock and/or vibration felt by a batter upon hitting a ball, a soft, flexible, and/or elastomeric material would often be used to provide such dampening. The soft, flexible and/or elastomeric material would also have the effect of reducing the overall stiffness of the bat. Accordingly, reducing the shock and/or vibration felt by a batter when hitting a bat is typically associated with, or correlated to, a reduction in the stiffness of the bat. Importantly, the element 20 provides an additional level of design flexibility in that the element can be formed with a high level of stiffness (or resistance to bending) and a high durometer (or a very hard material) while also providing exceptional vibration and/or shock reduction. The decoupling of these stiffness to shock and/or vibration dampening (or damping), and/or the decoupling of hardness to shock and/or vibration dampening are unique attributes provided by incorporation of the element 20 into the ball bat 10 and further increase the design flexibility of a bat designer. The element 20 can be used to significantly reduce the vibration and/or shock energy felt by a batter when impacting a ball (especially off-center impacts) without reducing the stiffness of the ball bat or without reducing the hardness of the element. In other embodiments, the element can be configured to be softer and/or more flexible. The present invention provides a player or bat designer with the ability to tailor, tune or customize a bat to meet any need, application or player type.

The bat frame 12 formed of the handle portion 16, the barrel portion 18 and the element 20 has a total length. The handle portion 16 has a length that less than 70 percent of the total length of the bat frame 12. In other preferred embodiments, the length of the handle portion is less than 60 percent of the total length of the bat frame 12.

Referring to FIG. 8*a*, an alternative preferred embodiment of the intermediate tapered element 20 is illustrated. The element 20 includes the proximal region 50 and the barrel engaging region 52. The tubular wall 62 defines the bore 60, and the outer wall 64 is spaced apart from the tubular wall 62 by a plurality of the ribs 66. The ribs 66 extend along the entire barrel engaging region 52 and into the proximal region 50 of the element 20 to define the cavities 72 that extend over at least 70 percent of the length of the element 20. In an alternative preferred embodiment, the element can be configured such that the cavities extend over at least 60 percent of the length of the element.

Referring to FIG. 8*b*, the cavities 72 defined by the tubular wall 62, the outer wall 64 and the ribs 66 can be at least partially filled with a filling material 90. In one preferred embodiment, the filling material 90 can be cellular material. In other preferred embodiments, the filling material 90 can be any material or combination of materials intended to alter one or more of the following characteristics of the element 20 and the bat 10, such as the weight or weight distribution of the bat, the perceived swing weight of the bat, the sound produced by the bat or the element upon impact with a ball, the vibration and/or shock dampening level of the bat upon impact, and the durability of the element. The filling material 90 can be a urethane, an ETPU, a cellular foam, a thermoplastic material, a thermoset material, a metal, wood, one or more weight elements, or combinations thereof.

Referring to FIG. 8*c*, in another alternative preferred embodiment, one or more of the ribs 66 may extend from one of the tubular wall 62 and the outer wall 64 to the other of the tubular wall 62 and the outer wall 64 without actually extending all the way to the other of the walls. In this manner, a gap 92 or space exists between the rib 66 and the outer wall 64 (or if the rib extends from the outer wall toward the tubular wall, then a space will exist between the rib and the tubular wall) thereby making adjacent cavities 72 continuous or a single cavity. The radial size of the gap 92 can be generally constant along the longitudinal length of the element. In one particularly preferred embodiment, the gap 92 (measured radially from the longitudinal axis between the rib and the outer wall (or the tubular wall) is within the range of 0.005 to 0.100 inch. In other alternative preferred embodiment, the gap may have other dimensions less than 0.005 inch or greater than 0.100 inch. The gap 92 may allow for greater flexing or flexibility, or controlled or stepped flexibility, of the element 20 during use. The gap 92 can also be employed to alter the feel, sound, weight, vibration dampening level or other characteristic of the element 20 or the bat 10 as a whole. In other preferred embodiments, the radial size of the gap 92 can become smaller or larger as at it extends along the longitudinal axis 14.

Referring to FIG. 9, in another alternative preferred embodiment, the element 20 can be formed without ribs and without cavities. Accordingly, the element 20 can be one continuous piece of material, such as a continuous base layer 54. In one particularly preferred embodiment, the element is continuous without any cavities or enlarged openings. In another alternative preferred embodiment, the element 20 can be formed of continuous material comprised of the base layer 54 and the over-molded outer layer 56.

Figure 10:
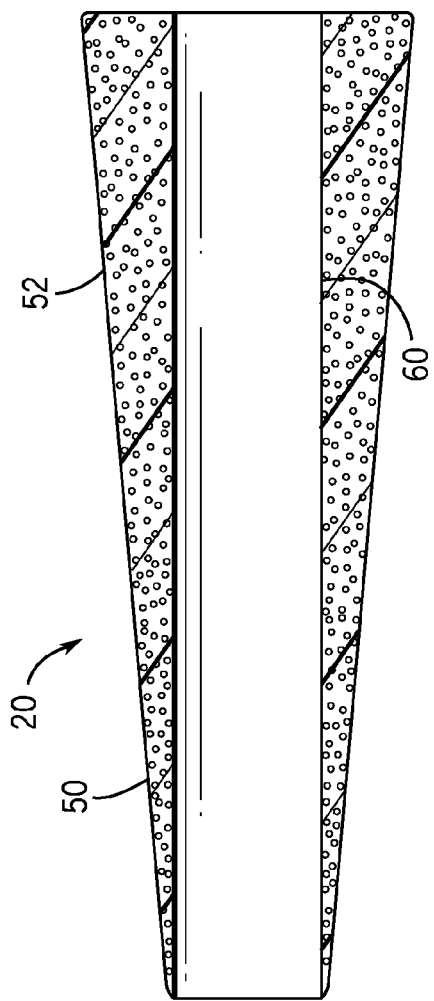
FIG. 10 is a longitudinal cross-sectional view of a tapered element of a ball bat in accordance with another alternative preferred embodiment of the present invention.

Referring to FIG. 10, in another alternative preferred embodiment, the element 20 can be formed a cellular material, and without ribs or cavities. The cellular material can be open cell material or closed cell material. The median size of the cells can also be varied depending upon the desired characteristics of the element 20. In another alternative preferred embodiment, the element formed of a cellular material can also be formed with at least one rib and a plurality of cavities.

Figure 11:
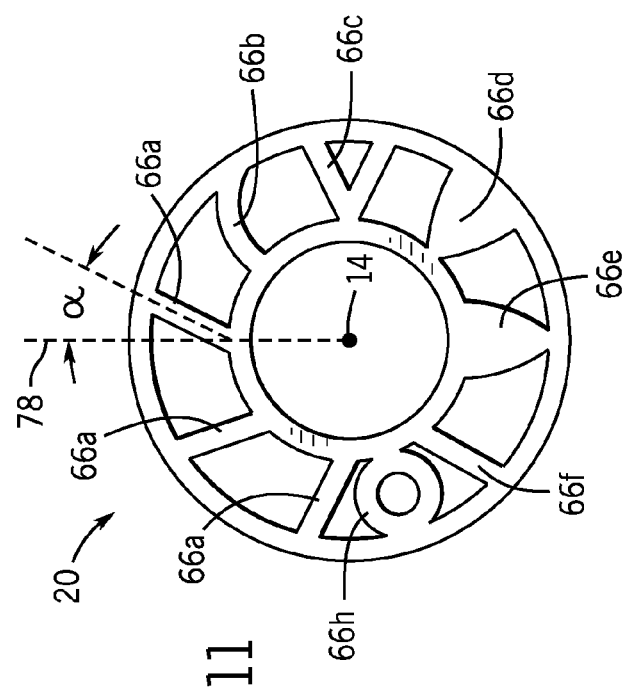
FIG. 11 is a distal end view of a tapered element of a ball bat in accordance with another alternative preferred embodiment of the present invention.

Referring to FIG. 11, alternative preferred embodiments of the rib of the element are illustrated. In particular, a variety of different shaped ribs 66 are illustrated. The ribs 66 can be generally planar and can generally extend radially from the tubular wall 62 to the outer wall 64 as illustrated in the embodiment of FIGS. 4 and 7. In alternative preferred embodiments, the ribs 66*a* can extend at angle α with respect to a plane 78 extending through and along the axis 14. The angle α can range from plus or minus 1 to 90 degrees from the plane 78. In one implementation, the angle α can range from plus or minus 1 to 45 degrees from the plane 78. Although only three ribs 66*a* are illustrated, it is understood that the element 20 can be formed with any number of the ribs 66*a* alone or in combination with one or more of the other shaped ribs. Other configurations for the ribs 66 are also illustrated. The rib 66*b* is curved at it extends from the tubular wall 62 to the outer wall 64. The rib 66*c* separates as it extends from the tubular wall 62 to the outer wall 64. The ribs 66*d* and 66*e* vary in thickness as they extend from the wall 62 to the wall 64. The rib 66*f* extends at a sharp angle from the tubular wall 62 to the outer wall 64. The rib 66*h* extends from the tubular wall 62 to the outer wall 64 in an ovular or circular shape. The present invention contemplates one or more of the illustrated ribs, or combinations of the illustrated ribs, to be used in the element. In other alternative embodiments, the one or more ribs may spirally extend along the element. In other alternative embodiments, the ribs may form a lattice structure. In still other alternative embodiments, the ribs may form other geometric or curved shapes.

Figure 14:
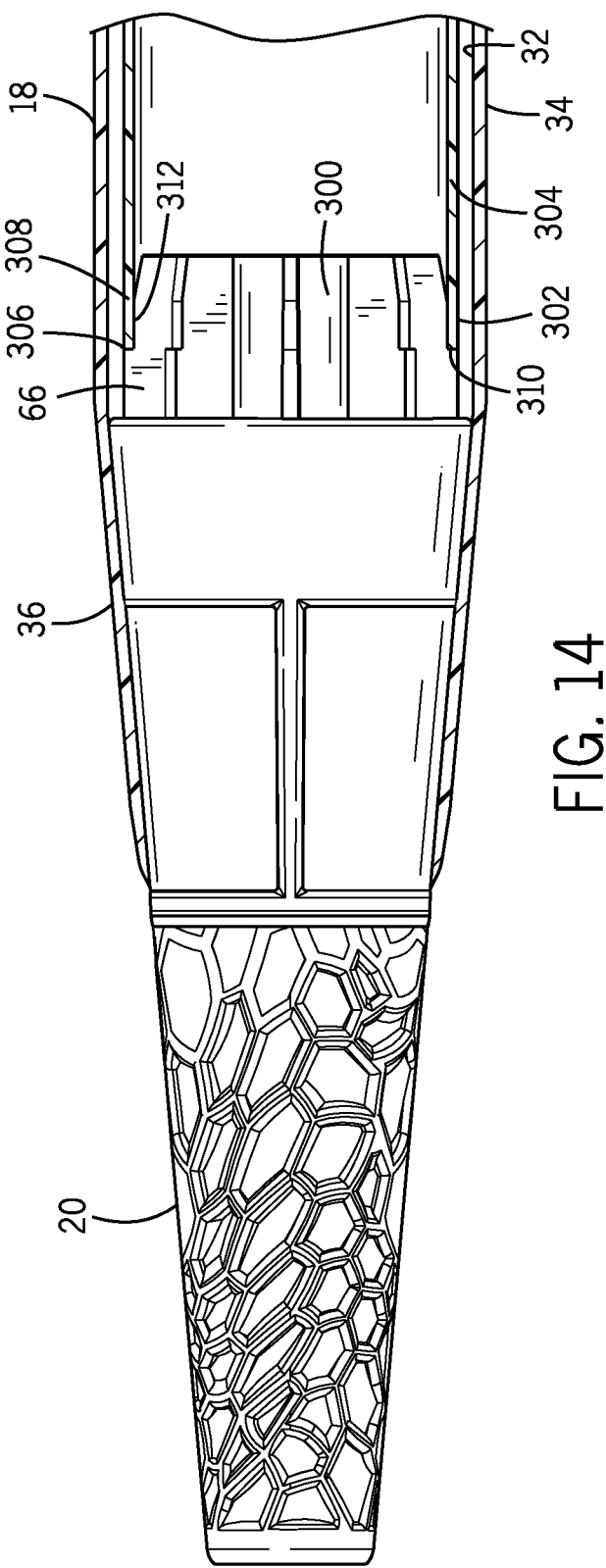
FIG. 14 is a side view of the element of FIG. 12 and a longitudinal cross-sectional view of a portion of the barrel portion and an insert.

Referring to FIGS. 12 through 14, another alternative preferred embodiment of the present invention is illustrated. The element 20 can be formed with an insert engaging portion 300 for engaging a proximal end region 302 of an insert 304. The tapered proximal region 50 and the barrel engaging region 52 of the element 20 of the embodiment of FIGS. 12 and 14 can be substantially similar to the tapered proximal region 50 and the barrel engaging region 52 of the previously described embodiments. The insert engaging portion 300 can be configured for engaging the insert 304 in a manner that securely positions the insert in a location such that at least a portion of the insert 304 is separated from the barrel portion 18 by a desired or predetermined amount.

The insert 304 is a tubular body that can have a consistent inner and outer diameter or can be formed with some amount of taper or curvature along its length such that the insert is cylindrical or substantially cylindrical. The insert can be formed of one or more of the materials used to form the barrel portion 18, as described above. The insert includes a proximal end region 302 and a distal end region. Over at least a portion of the length of the insert 304, the insert 304 is preferably visibly spaced apart from the inner surface 32 of the barrel portion 18. The separation of the insert 304 and the barrel portion 18 is preferably sized to be within the range of 0.005 to 0.125 in (when measured radially from the longitudinal axis 14 to the outer surface 34 of the barrel portion 18) such that the insert 304 is sufficiently separated from the inner surface of the barrel portion 18 to allow for independent movement between the two elements, while still allowing for operable engagement of the barrel portion 18 and the insert 304 upon impact with a ball. In another preferred embodiment, the separation of the insert 304 and the barrel portion 18 can be just sufficient enough to allow for independent movement of the insert 304 relative to the barrel portion 18 upon impact with a ball. Independent movement between the insert 304 and the barrel portion 18 may exist even if the separation is not visible to the naked eye.

In one particularly preferred embodiment, at least one of the ribs 66 and the tubular wall 62 can longitudinally extend from the barrel engaging portion 52 to form the insert engaging portion 300. In the embodiment of FIGS. 12 through 14, all eight of the ribs 66 are shown extending from the barrel engaging portion 52 of the element 20. In alternative preferred embodiments, other numbers of ribs can also be used. In one particularly preferred embodiment, at least three radially spaced apart ribs extend from the barrel engaging portion 52 to provide at least three lines or points of contact for supporting the tubular insert 304.

Each rib 66 may include a shoulder 306 for engaging the proximal end 308 of the insert 304. The shoulder 306 enables the rib 66 to provide a stop 310 that limits the longitudinal movement of the insert 304 in a proximal direction, and an insert bearing surface 312 for supporting a portion of the inner surface of the proximal end region 302 of the insert 304. The insert engaging portion 300 provides a secure support for the proximal end region 302 of the insert 304. The insert engaging portion 300 is another important feature or function that can be incorporated into and supplied by the element 20. The insert engaging portion 300 further increases the versatility and customization possibilities available to the bat designer or user. The element 20 entirely isolates and separates the insert 304 and the barrel portion 18 from contact with the handle portion 16 thereby further enhancing reduction of undesirable vibrational and/or shock energy extending along the bat from the barrel portion to the handle portion in response to impact with a ball. The handle portion 16 is free of contact with the barrel portion 18 and free of contact with the insert 304.

In another alternative preferred embodiment, the insert engaging portion 300 can be incorporated into the barrel engaging portion of the element. In yet another alternative preferred embodiment, the insert engaging portion may include a ring, a band or other tubular form of bearing support for supporting the inner surface of the insert. The tubular bearing support can have a uniform diameter along its length or include a taper or frustoconical shape. In another alternative preferred embodiment, the tubular bearing support can include a continuous shoulder and a continuous insert bearing surface (similar to the shoulder 306 and bearing surface 312, but continuous and not spaced apart as shown in FIGS. 12 through 14)

Figure 15:
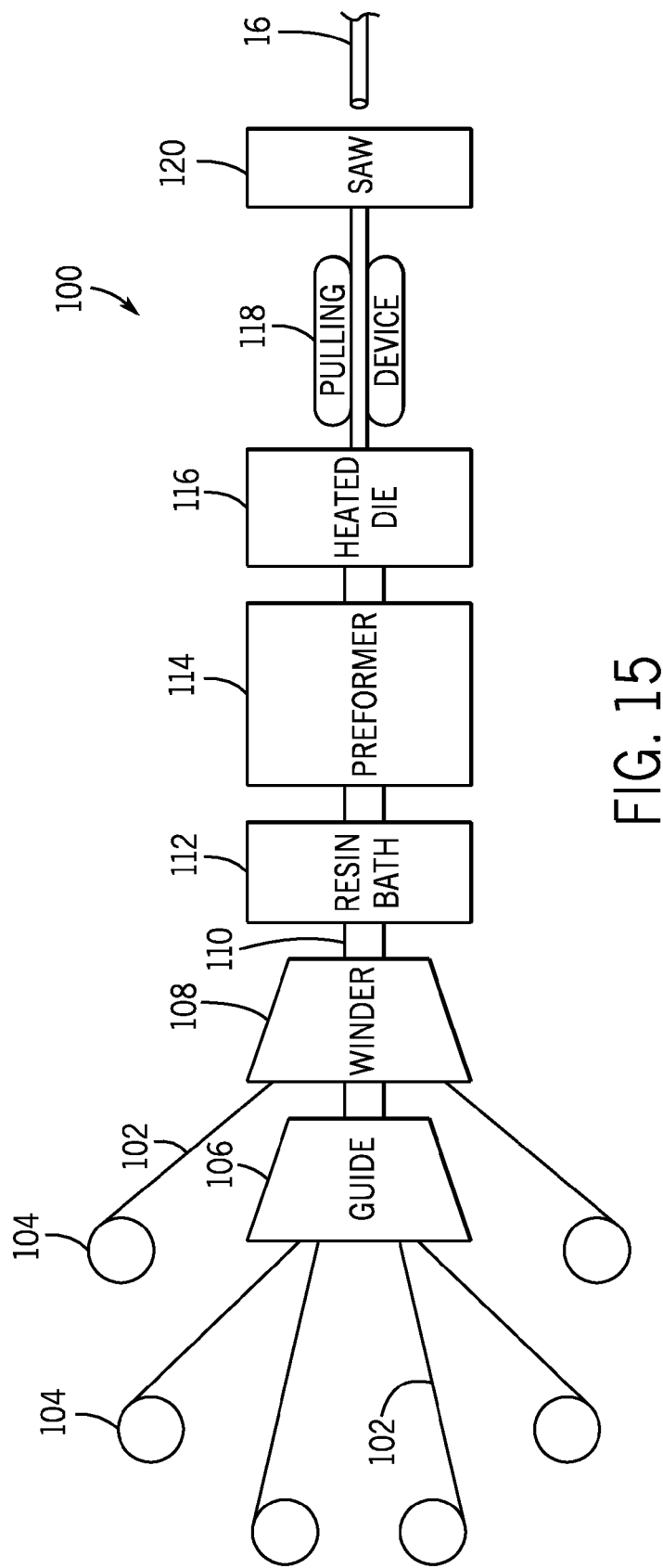
FIG. 15 illustrates a pultrusion method of forming a plurality of handle portions of a ball bat in accordance with an alternative preferred embodiment of the present invention.

Referring to FIG. 15, in one preferred embodiment, the handle portion 16 is formed from a pultrusion process. FIG. 15 illustrates one pultrusion process arrangement. One of skill in the art would understand that other arrangements of pultrusion process components can be used to produce pultruded components, such as handle portions, barrel portions or inserts of ball bats. The present invention contemplates the use of all existing arrangements of pultrusion processes for producing fiber reinforced thermoplastic or fiber composite ball bat components.

Pultrusion is one of the most cost effective methods of producing high quality fiber reinforced thermoplastic materials or fiber composite materials. Pultrusion is similar to extrusion but differs in that extrusion relies on a press to push unreinforced thermoplastic materials through a short die. Pultrusion involves pulling a variety of reinforced fibers, wetted by one or more thermosetting or thermoplastic resins through a heated die to produce a continuous article, such as a cylindrical handle portion. Polymerization of the resin occurs as the wetted fibers pass through the heated die to cure the resin and form a continuous rigid structure. Pultrusion is ideal for producing fiber reinforced thermoplastic or fiber composite materials. It is a continuous process that produces very little waste. The fibers can extend along the longitudinal axis of the cylindrical article or be applied, or pulled from an angle with respect to the longitudinal axis and wound around to produce a number of different angled fiber configurations. The fibers can also be pulled through the pultrusion process as part of a woven fabric (a braided fabric or a tubular sock like fabric) thereby enabling the pultruded component to have some fibers that extend at a 90 degree angle with respect to the longitudinal axis 14. The pultrusion process can result in a continuous cylindrical body extending that then can be cut into desired lengths. Numerous process variables such as pull speed, die temperature, quality of fiber/resin wet-out, and fiber volume can affect the quality of pultruded composites.

A pultruded composite material can consist of reinforcing materials, such as unidirectional fibers (or rovings), continuous fiberglass mat and a thermoset resin that binds the composite together. A polyester surfacing veil to improve the external appearance of the composite, and chemical resistance or weather-ability may also be added. A variety of ancillary materials may be added to the resin formulation, such as pigment for color, accelerators to speed the curing of the thermoset resin, internal release agents, and several various types of inert fillers, each having its own functionality. A pultruded profile can be uniquely designed to meet a custom application. An in-line winder can be combined with the pultrusion process to add filament winding capability which allows for increase bi-axial strength.

One preferred embodiment of a pultrusion process for making a handle portion 16 is illustrated as item 100 in FIG. 15. A plurality of fibers 102 are fed from one or more creels 104 into a guide 106. One or more of the fibers 102 may be wound around one or more of the other fibers 102 using an inline winder 108. The inline winder 108 provides for fibers extending through the pultruded product (the handle portion 16) in a non-zero fiber position. The angle of the fibers applied from the inline winder 108 can vary from 1 degree to 89 degrees. More preferably, the angle of the fibers applied from the inline winder can vary from 5 degrees to 45 degrees. The winder increases the biaxial strength of the pultruded component. The assembly of fibers 110 is then fed through a resin bath 112. The resin bath 112 impregnates (or coats and surrounds) the assembly of fibers 110 with a thermosetting or thermoplastic resin. The resin bath 112 can be an open bath system or an injected die system. Upon exiting the resin bath 112, the wetted fiber assembly 110 can be formed in one or more performers 114. The performer 114 is configured to facilitate the orientation of the fibers 110 prior to entry into a heated die 116. The heated die shapes the wetted fibers into the desired configuration and controls the curing of the shaped assembly of wetted fibers. A pulling device 118 pulls the assembly of fibers 110 through the process. The pulling device 118 can consist of a pair of reciprocating clamp pullers, or continuous pullers, such as a pair of continuous belts containing pads for engaging the wetted fiber assembly. The pullers can be synchronized for a continuous pull at the desired speed typically ranging from 6 inches per minute to 14 feet per minute. In other embodiments, the pulling device 118 can be configured to provide an intermittent pull. The pultruded product is then typically cut at a predetermined desired length by a cut-off saw 120. The pultrusion process 100 can be used to produce high quality fiber composite handle portions 16 with the desired characteristics such as resistance to longitudinal bending, weight, strength, etc. The pultrusion process 100 can also be used to produce barrel portions or barrel inserts that have substantially uniform diameters over their length.

Figure 16:
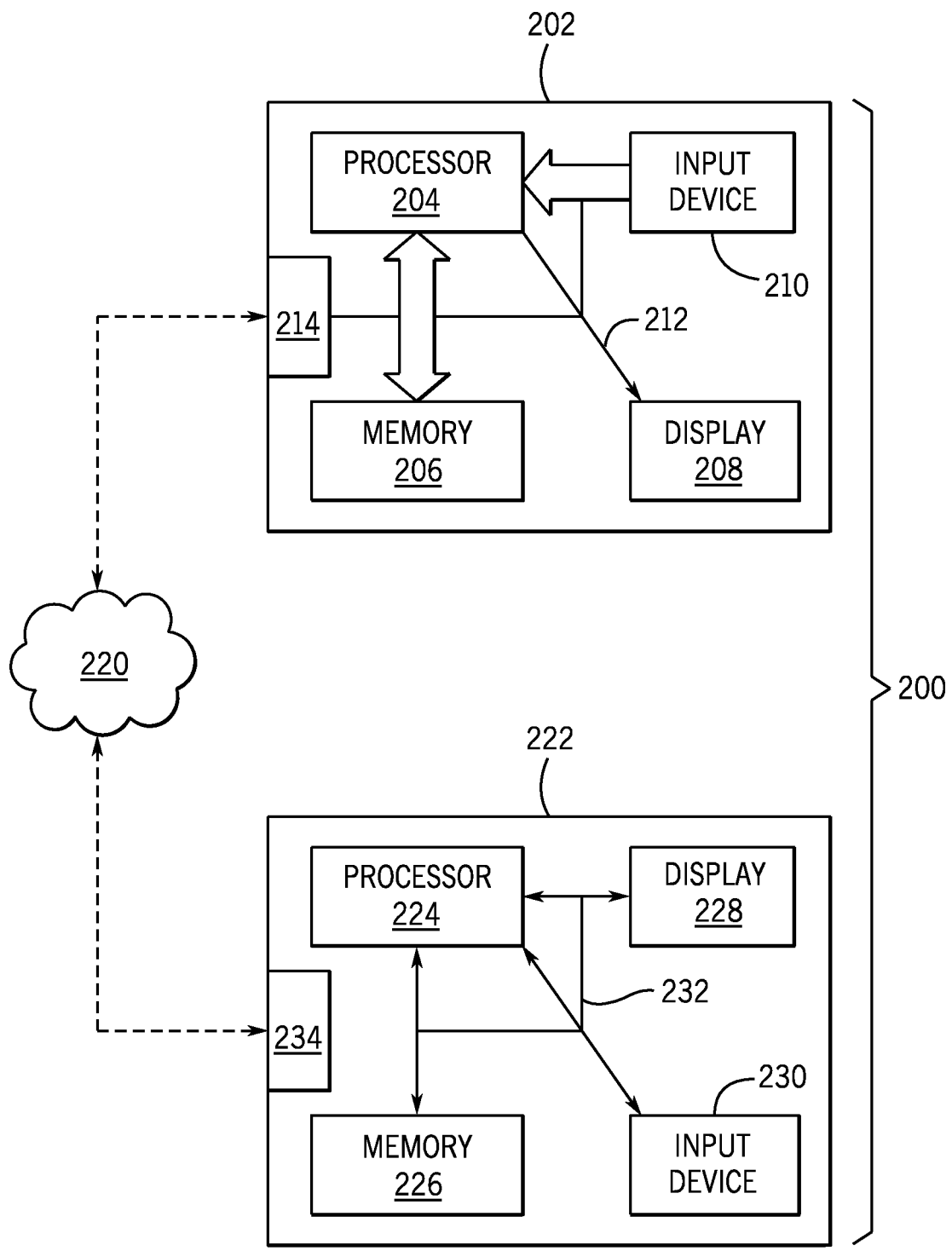
FIG. 16 schematically illustrates a system for customizing and ordering a ball bat in accordance with an alternative preferred embodiment of the present invention.

Referring to FIGS. 16 through 25, a system and method of customizing a ball bat for a particular player, team, application, or league are illustrated. Various aspects of the present invention may be implemented using a programmable computing device or a computer executing software instructions. FIG. 16 shows an example of a system 200 for customizing a ball bat. The system 200 is intended to be a representative example. One of skill in the art would understand that other arrangements of electronic components and communication links can be employed for implementing the system 200. An electronic device 202, such as a computer, smart phone, tablet, a personal data assistant, a digital music player (IPOD etc) or a tablet, includes a processor 204, a system memory 206, a display 208, input device 210, a system bus 212 coupling the components together, and an device interface 214. In one preferred embodiment, the display 208 can be a touch screen and also serve as the input device 210.

The processor 204 comprises one or more processing units configured to carry out instructions contained in one or more instruction modules of the memory 206. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, the memory 206 may be embodied as part of one or more application-specific integrated circuits (ASICs). Unless otherwise specifically noted, the controller is not limited to any specific combination of hardware circuitry and software, or to any particular source for the instructions executed by the processing unit.

The memory 206 comprises a persistent storage device or non-transient computer-readable medium storing data and code. The system memory 206 may include ROM and RAM, a mass storage device, and/or some other persistent storage. The input devices 210 employed by the computer 202 may be a keyboard, a joystick, a mouse, a keypad, a touch screen, a voice activated input and other related input devices.

The device interface 214 may be any type of interface used to obtain and/or send data from and/or to another device. For example, the device interface 214 may be a conventional connector/port type interface, such as universal serial bus (USB) interface, a Firewire/IEEE 1394 interface, a PS/2 interface, a PC/AT interface, an RS-232 interface, a serial port interface, or an Ethernet port or other telephone-type interface. Still further, the device interface 214 may include a wireless transceiver for wireless communication with another device. For example, the device interface 214 may be implemented with a radio frequency transceiver, such as a WiFi or Bluetooth wireless transceiver. The device interface 214 may alternately be implemented with an infrared frequency transceiver, a light frequency transceiver, or an ultrasonic frequency transceiver. The device interface 214 may be an internal interface, or it may alternately be an external network interface as is well known in the art. Of course, it will be appreciated that other means of establishing a communications link with other computers may be used. Also, with various examples of the invention, the computer 202 may have a plurality of device interfaces 214.

Typically, the computer 202 will be configured to access one more other computing devices. The computer 202 will normally be capable of operating in a networked environment using logical connections to one or more remote devices, such as other computers 222. The computer 202 may be connectable to one or more remote devices through a local area network (LAN) or a wide area network (WAN), such as the Internet 220. The remote computer 222 may include similar components as the computer 202 including a processor 224, a memory 226, a display 228, an input device 230, a bus 232 and a device interface 234. When used in a networking environment, the computer system 202 may be connected to the network through the device interface 214.

Referring to FIGS. 17 through 25, the computer 202 will execute software instructions to implement various embodiments of the invention. Based upon these instructions, the computer 202 will display a series of a graphical user interfaces to a user. The user will then manipulate one or more input devices 210 to input data to the computer 202 through the user interface (display) 208. For example, with various implementations of the invention, a user will manipulate an input device 210, such as a pointing device like a mouse, roller ball, joystick or touchpad, to change the appearance of a selection indicator imbedded in the graphical user interface. The user input 210 is used to select a characteristic, feature, option or selection presented to the user on a particular graphical user interface.

FIGS. 16 through 25 illustrate an example of the bat customization tool, system or method 200 for configuring, designing, specifying, selecting or ordering a customized ball bat. The display 208 displays a series of customized user interfaces, UIs, (FIGS. 16 through 24), including a visual display of various options available for selection and/or customization by the user. By using the input device 210, such as a mouse, touchpad or keyboard, a user can input information for customization of the ball bat into the computer 202. A user can make an input selection by selecting one or more features, characteristics or options of the customized ball bat. The UIs can include other information such as the name of the manufacturer, characteristics of various bat models or bat components, other marketing materials, helpful hints, design tips, selections of designs, fonts, graphics and styles for review by the user.

In response, the computer 202 receives the selection information can process or organize or relay the input information to the display 208, store it in the memory 206 or transmit the information to a location apart or remote from the computer 202, such as via the internet 220 to one or more other electronic devices 222. The device interface 214 can transfer the selection information or process selection information to a retailer, manufacturer or supplier of the customized bat for processing.

If the information is being provided to a retailer, for example the retailer can review its stock and select the bat components having the feature characteristics specified by the user. If the information is being provided to a manufacturer or supplier, the manufacturer or supplier may employ the selection information to manufacture a new ball bat or ball bat component that has the feature characteristics specified by the user. With some examples of the invention, the user's input selection data may be continuously provided a retailer, supplier or manufacturer. Alternately, the user's input selection data may be provided to a retailer, supplier or manufacturer after the user has indicated that the input selection data represents a final set of ordering information. For example, system 200 may postpone providing the user's selection information to a retailer or manufacturer until after the user also has provided purchasing information, such as a credit card account information or electronic payment service account information.

Figure 17:
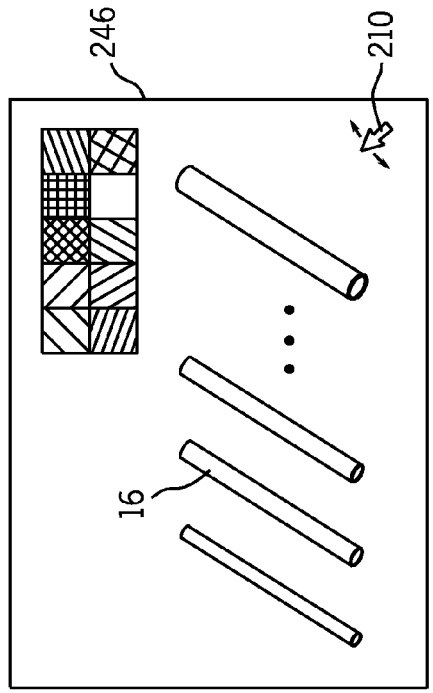
FIGS. 17 through 25 illustrate examples of user interfaces for customizing a ball bat and components thereof in accordance with the system of FIG. 16.

Referring to FIG. 17, a user interface UI 240 is illustrated. UI 240 provides a plurality of windows configured to obtain information about the intended user of the customized bat or the application for the customized bat. The GUI 240 can provide prompts, windows or selection options 242 for determining the user's age, height, weight, and/or sex, the league or organization the bat will be used in, the user's skill level, any applicable player goal, the user's budget, and combinations thereof. The UI 240 can also include one or more data fields 244 for allowing a user to enter alphanumeric data (e.g., the user's nickname) onto particular locations of the customized bat. UI 240 is one representation of how this type of information can be inputted into the bat customization system. Other configurations of UI 240 can also be used.

Figure 18:
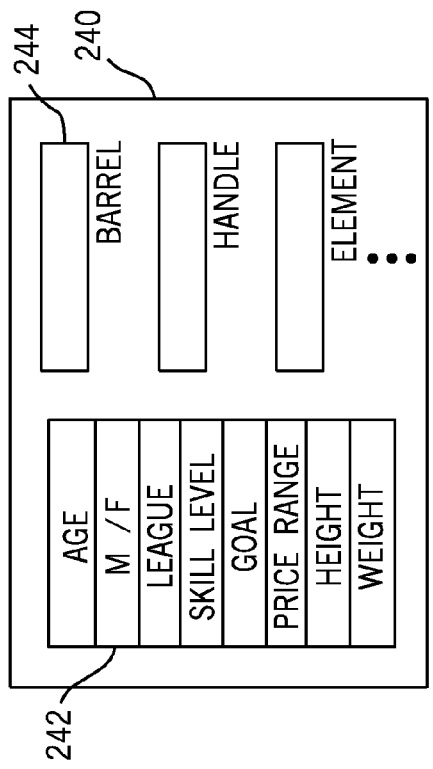

Referring to FIG. 18, a user interface UI 246 is illustrated. A plurality of handle portions 16 is illustrated. The UI 246 may also include one or more windows providing variations of a characteristic of the handle portions 16. The characteristic can be length, outer diameter, weight, color, resistance to bending, material, and combinations thereof. The input device 210 can be used to make a selection or otherwise navigate through the UI 246. GUI 246 is one representation of a UI for allowing a user to select a handle portion that is best for his or her needs, skill level, league, size, age, strength, etc. Other representations of the UI 246 can also be used. In another implementation, a single handle portion 16 can be illustrated, and one or more of the characteristics of the handle portion 16 can be varied based upon input from the user through the input device 210. For example, the handle portion 16 may be shown in a first color, a first length and a first diameter. The user can select or input through the input device 210 one or more different colors, a different length, and/or a different diameter.

Figure 19:
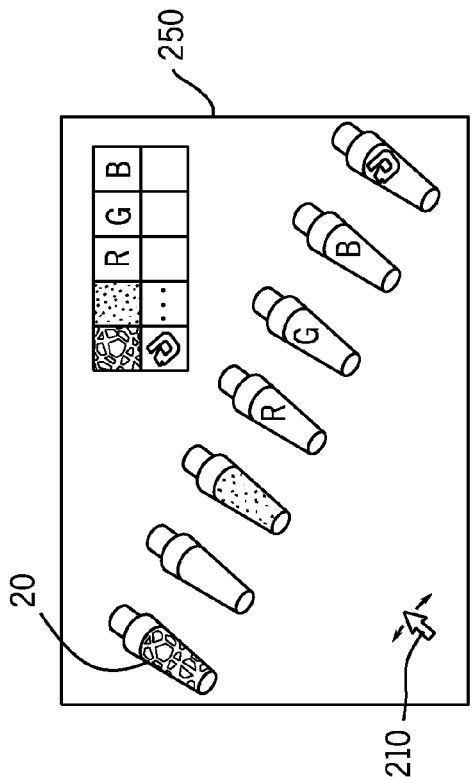

Referring to FIG. 19, a user interface UI 248 is illustrated. A plurality of barrel portions 18 is illustrated. The UI 248 may also include one or more windows providing variations of a characteristic of the barrel portions 18. The characteristic can be length, outer diameter, weight, weight distribution, nominal outer diameter, maximum outer diameter, model name, color, stiffness, material, and combinations thereof. The input device 210 can be used to make a selection or otherwise navigate through the UI 248. UI 248 is one representation of a UI for allowing a user to select a barrel portion that is best for his or her needs, skill level, league, size, age, strength, etc. Other representations of the UI 248 can also be used. In another implementation, a single barrel portion 18 can be illustrated, and one or more of the characteristics of the barrel portion 18 can be varied based upon input from the user through the input device 210. For example, the barrel portion 18 may be shown in a first color, a first length and a first diameter. The user can select or input through the input device 210 one or more different colors, a different length, and/or a different diameter.

Figure 20:
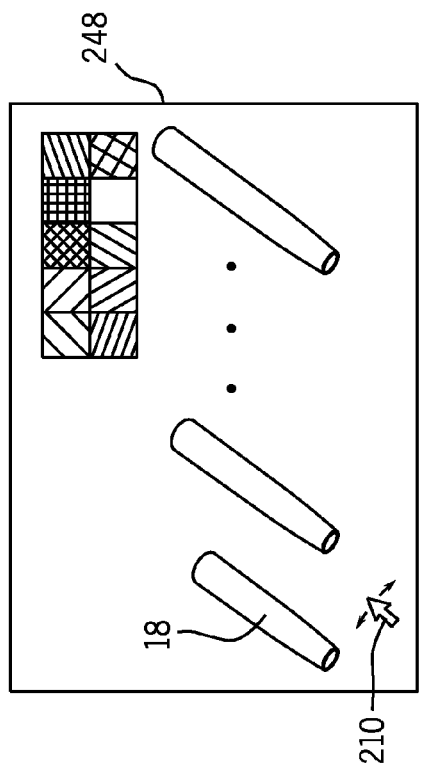

Referring to FIG. 20, a user interface UI 250 illustrating a plurality of intermediate tapered elements 20 are provided. The UI 250 may also include one or more windows providing variations of a characteristic of the elements 20. The characteristic can be length, weight, model name, color, shape, texture, pattern, material, and combinations thereof. The input device 210 can be used to make a selection or otherwise navigate through the UI 250. UI 250 is one representation of a UI for allowing a user to select an element that is best for his or her needs, skill level, league, size, age, strength, etc. Other representations of the UI 250 can also be used. In another implementation, a single element 20 can be illustrated, and one or more of the characteristics of the element 20 can be varied based upon input from the user through the input device 210. For example, the element 20 may be shown in a first color and a first length. The user can select or input through the input device 210 one or more different colors and/or a different length.

Figure 21:
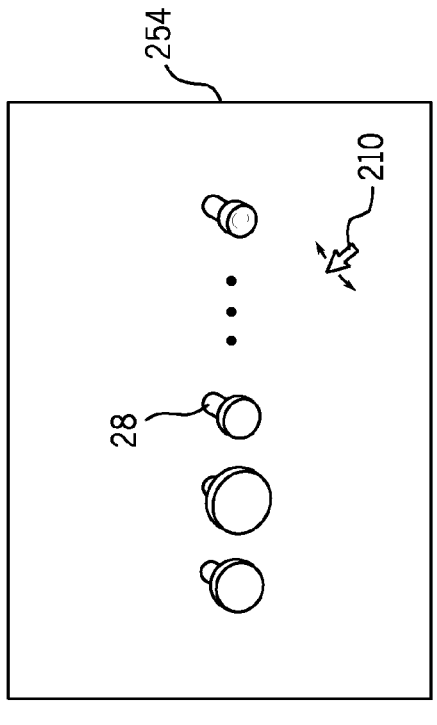
Figure 22:
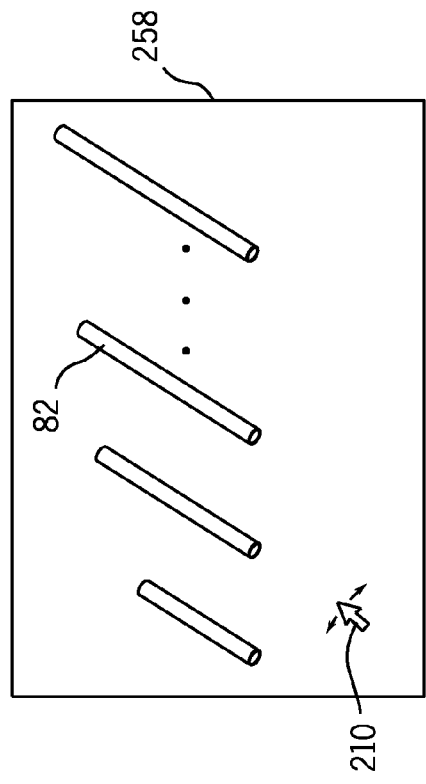

Referring to FIGS. 21 and 22, user interfaces UIs 252 and 254 illustrating a plurality of end caps 30 and knobs 28 are provided. The UIs 252 and 252 may also include one or more windows providing variations of a characteristic of the end caps 30 and the knobs 28, respectively. The characteristic can be weight, model name, color, shape, texture, pattern, design, material, and combinations thereof. The input device 210 can be used to make a selection or otherwise navigate through the UI 252 or the UI 254. UIs 252 and 254 are one set of representations of a UI for allowing a user to select an end cap 30 or a knob 28 that is best for his or her needs, skill level, league, size, age, strength, etc. Other representations of the UI 252 or the UI 254 can also be used. In another implementation, a single end cap 30 and/or a single knob 28 can be illustrated, and one or more of the characteristics of the end cap 30 and/or the knob 28 can be varied based upon input from the user through the input device 210. For example, the end cap 30 and/or the knob 28 may be shown in a first color and a first size. The user can select or input through the input device 210 one or more different colors and/or a different size.

Figure 23:
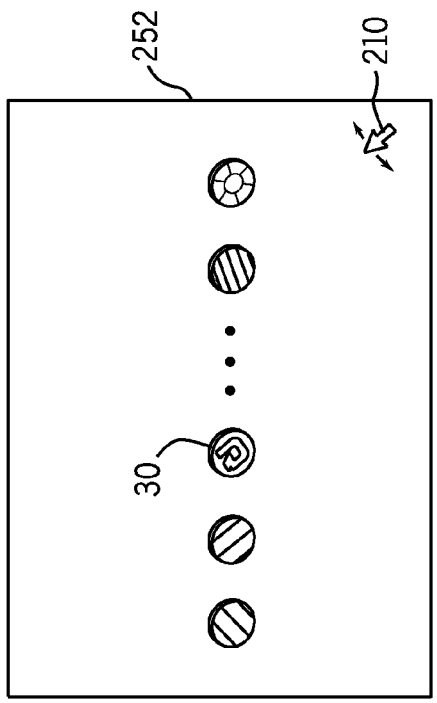

Referring to FIG. 23, a user interface UI 256 illustrating a plurality of grips 26 are provided. The UI 256 may also include one or more windows providing variations of a characteristic of the grips 26. The characteristic can be length, color, thickness, texture, pattern, material, and combinations thereof. The input device 210 can be used to make a selection or otherwise navigate through the UI 256. UI 256 is one representation of a UI for allowing a user to select an element that is best for his or her needs, skill level, league, size, age, strength, etc. Other representations of the UI 256 can also be used. In another implementation, a single grip 26 can be illustrated, and one or more of the characteristics of the grip 26 can be varied based upon input from the user through the input device 210. For example, the grip 26 may be shown in a first color and a first texture. The user can select or input through the input device 210 one or more different colors and/or a different texture.

Figure 24:
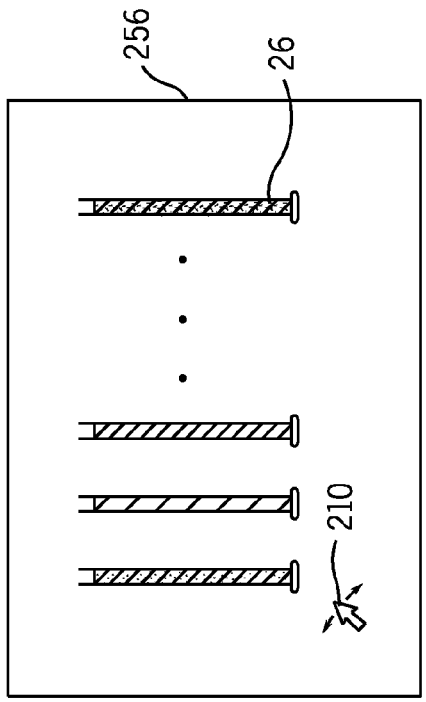

Referring to FIG. 24, a user interface UI 258 is illustrated. A plurality of tubular inserts 82 is illustrated. The UI 258 may also include one or more windows providing variations of a characteristic of the tubular insert 82. The characteristic can be length, outer diameter, weight, weight distribution, outer diameter, model name, stiffness, material, and combinations thereof. The input device 210 can be used to make a selection or otherwise navigate through the UI 258. UI 258 is one representation of a UI for allowing a user to select a tubular insert that is best for his or her needs, skill level, league, size, age, strength, etc. Other representations of the UI 258 can also be used.

Figure 25:
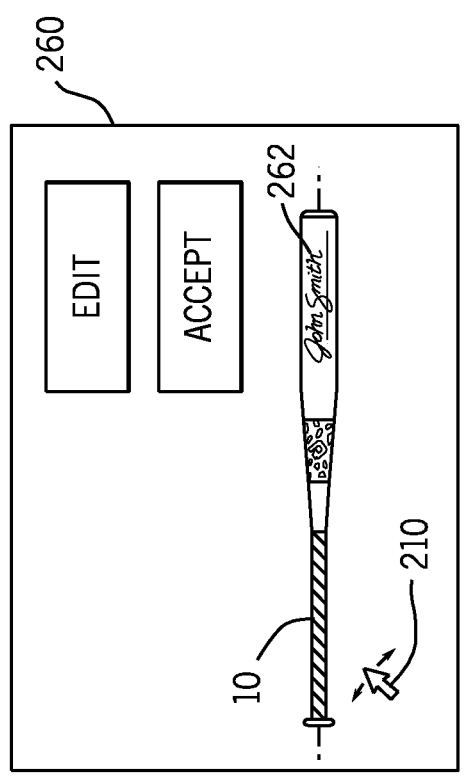

Referring to FIG. 25, a UI 260 can be configured to illustrate the assembled bat 10 in accordance with the user's inputted selections. The UI 260 can also provide the user with the ability to edit, accept or cancel the selection. For example, different colors, color combinations, graphics, styles, indicia, such as name 262, model names, etc. can be used, adjusted or edited by the user. Exploded views, zoom features or other component views may be available in the UI 260 to facilitate visualization of the selected customized ball bat. The UI 260 enables the user to input one or more graphical and/or alphanumeric indicia onto one or more of the ball bat components. For example, the player's name or the player's team name may be uploaded to the system 200 for presentation onto UI 260 or one of the other UIs. The user can then adjust the size, position, color, colors, font, style, and other parameter on the UI 260. The user can input a selection of a particular orientation, color, style of the indicia, remove the indicia, or continue to edit the indicia.

The UIs 246 through 260 can be arranged in different order, different styles or in different combinations. In one implementation, the representations of the bat components can be shown building one upon another. For example, the UI 248 may be presented first to the user enabling the barrel portion 18 to be selected, followed by UI 258 selecting an insert, followed by the UI 246 and UI 250. In such an implementation, the UI can illustrate the bat 10 being assembled component by component on the display. The UIs can be arranged in any order, or combined in any combination.

The bat 10 of the present invention provides numerous advantages over existing ball bats. One such advantage is that the bat 10 of the present invention is configured for competitive, organized baseball or softball. For example, embodiments of ball bats built in accordance with the present invention can fully meet the bat standards and/or requirements of one or more of the following baseball and softball organizations: Amateur Softball Association of America ("ASA") Bat Testing and Certification Program Requirements (including the current ASA 2004 Bat Standard and the ASA 2000 Bat Standard); United States Specialty Sports Association ("USSSA") Bat Performance Standards for baseball and softball; International Softball Federation ("ISF") Bat Certification Standards; National Softball Association ("NSA") Bat Standards; Independent Softball Association ("ISA") Bat Requirements; Ball Exit Speed Ratio ("BESR") Certification Requirements and other requirements of the National Federation of State High School Associations ("NFHS"); Little League Baseball Bat Equipment Evaluation Requirements; PONY Baseball/Softball Bat Requirements; Babe Ruth League Baseball Bat Requirements; American Amateur Baseball Congress ("AABC") Baseball Bat Requirements; and, especially, the NCAA BBCOR Standard or Protocol. Accordingly, the term "bat configured for organized, competitive play" refers to a bat that fully meets the ball bat standards and/or requirements of, and is fully functional for play in, one or more of the above listed organizations.

Further, bats produced in accordance with the present invention can be configured and customized to fully satisfy the particular needs of a particular user, while providing players with a bat that is reliable, playable, produces exceptional feel and optimizes performance along the barrel portion or hitting portion of the bat. Bats built in accordance with the present invention provide the player with exceptional feel and performance because the element isolates the barrel portion (and if applicable, the insert) from the handle portion of the bat thereby significantly reducing (or reducing as desired by the player or bat designer) the amount of vibrational and/or shock energy reaching the player through the handle portion upon impact with a ball. Bats configured in accordance with the present invention are cost effective, can be produced quicker with shorter lead times, less waste, and using fewer man-hours. The present invention significantly improves the flexibility of the bat design further increasing the ability of the bat to be specifically tailored, tuned and designed for a particular player, a particular team, and/or a particular application. The present invention can be used by retailers of all types, including on-line retailers, to provide custom, made-to-order ball bats in an efficient and cost-effective manner. The present invention will enable many suppliers to store or acquire bat components and not completed bats, thereby making ball bat stocking more efficient, resulting in fewer unused or close-out bat models.

While the preferred embodiments of the invention have been illustrated and described, it will be appreciated that various changes can be made therein without departing from the spirit and scope of the invention. One of skill in the art will understand that the invention may also be practiced without many of the details described above. Accordingly, it will be intended to include all such alternatives, modifications and variations set forth within the spirit and scope of the appended claims. Further, some well-known structures or functions may not be shown or described in detail because such structures or functions would be known to one skilled in the art. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. A ball bat extending along a longitudinal axis, the bat comprising:
 a handle portion having a generally uniform outer diameter with respect to the longitudinal axis;
 a barrel portion having a proximal region and a distal region spaced apart by a central region;
 an injection molded element including an outer wall extending over at least a portion of the length of the element and a tubular inner wall defining a longitudinal bore having a uniform inner diameter, the at least a portion of the handle portion extending into, and engaging the inner diameter of, the bore, the element non-removably attached to the handle member, the element including a tapered proximal region, a barrel engaging region, and a distal insert engaging region, at least a portion of the distal insert engaging region extending from the barrel engaging region toward the distal region of the barrel portion, a portion of the outer wall of the element being visible to a user; and
 a tubular insert extending along at least the proximal region and the central region of the barrel portion and engaged with the insert engaging region of the element, the insert engaging region including a stop for engaging the insert and inhibiting longitudinal movement of the insert in a proximal direction, the proximal end region of the barrel portion overlapping and non-removably engaging the barrel engaging region of the element, the bat having a total length measured from a proximal end of the handle portion to a distal end of the barrel portion, the handle portion having a length that is less than 70 percent of the total length.

2. The ball bat of claim 1, wherein the outer wall spaced apart from the tubular wall by at least one rib.

3. The ball bat of claim 2, wherein the at least one rib radially extends with respect to the longitudinal axis from the tubular wall to the outer wall.

4. The ball bat of claim 2, wherein the at least one rib extends from the tubular wall to the outer wall at an angle when measured with respect to a plane extending through and along the longitudinal axis.

5. The ball bat of claim 2, wherein the at least one rib is at least three ribs.

6. The ball bat of claim 2, wherein the at least one rib is spiraled about the longitudinal axis.

7. The ball bat of claim 1, wherein the element is entirely injection molded.

8. The ball bat of claim 1, wherein the barrel engaging region of the element has a generally frustoconical shape.

9. The ball bat of claim 8, wherein the proximal region of the barrel portion generally converges toward the longitudinal axis to form a frustoconical shape that is complementary to and telescopically engages the barrel engaging region of the element.

10. The ball bat of claim 1, wherein the barrel engaging region of the element non-threadedly engages the proximal region of the barrel portion.

11. The ball bat of claim 2, wherein the outer wall of the element includes at least one base layer formed of at least a first material, and an outer layer formed of a second material.

12. The ball bat of claim 11, wherein the hardness of the first material is greater than the hardness of the second material, wherein the hardness is measured on a Shore hardness scale.

13. The ball bat of claim 11, wherein the first and second materials are formed of different colors.

14. The ball bat of claim 11, wherein the texture of the outer layer is different than the texture of the outer surface of the base layer.

15. The ball bat of claim 11, wherein the outer layer is over-molded to the at least one base layer.

16. The ball bat of claim 11, wherein the outer layer includes one or more openings enabling at least a portion of the base layer to be visible on the outer surface of the element.

17. The ball bat of claim 1, wherein the tapered proximal region includes graphical and/or alphanumeric indicia.

18. The ball bat of claim 1, wherein the handle portion is a pultrusion.

* * * * *